United States Patent
Kahn et al.

(10) Patent No.: US 9,998,789 B1
(45) Date of Patent: Jun. 12, 2018

(54) AUDIENCE INTERACTION SYSTEM

(71) Applicants: Philippe Richard Kahn, Santa Cruz, CA (US); Arthur Kinsolving, Santa Cruz, CA (US)

(72) Inventors: Philippe Richard Kahn, Santa Cruz, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 0 days. days.

(21) Appl. No.: 14/280,554

(22) Filed: May 16, 2014

Related U.S. Application Data

(63) Continuation-in-part of application No. 13/842,430, filed on Mar. 15, 2013, now abandoned.

(60) Provisional application No. 61/676,658, filed on Jul. 27, 2012.

(51) Int. Cl.
| | |
|---|---|
| *H04N 7/16* | (2011.01) |
| *H04N 21/466* | (2011.01) |
| *H04N 21/25* | (2011.01) |
| *H04N 21/422* | (2011.01) |
| *H04N 21/475* | (2011.01) |

(52) U.S. Cl.
CPC ....... *H04N 21/4667* (2013.01); *H04N 21/252* (2013.01); *H04N 21/42201* (2013.01); *H04N 21/42202* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 5,726,701 A | 3/1998 | Needham | |
| 6,317,881 B1 | 11/2001 | Shah-Nazaroff et al. | |
| 9,219,790 B1 * | 12/2015 | Filev | H04L 67/22 |
| 2002/0018124 A1 | 2/2002 | Mottur et al. | |
| 2003/0033600 A1 | 2/2003 | Cliff et al. | |
| 2004/0158865 A1 * | 8/2004 | Kubler | G06Q 30/02 |
| | | | 725/82 |
| 2008/0046910 A1 | 2/2008 | Schultz et al. | |
| 2010/0211439 A1 * | 8/2010 | Marci | H04N 21/84 |
| | | | 705/7.29 |
| 2011/0090085 A1 * | 4/2011 | Belz | G08B 21/0423 |
| | | | 340/573.1 |
| 2012/0144416 A1 | 6/2012 | Wetzer et al. | |
| 2012/0204202 A1 | 8/2012 | Rowley et al. | |
| 2012/0224024 A1 | 9/2012 | Lueth et al. | |
| 2012/0271711 A1 | 10/2012 | Moshiri et al. | |
| 2012/0324494 A1 | 12/2012 | Burger et al. | |
| 2013/0042174 A1 * | 2/2013 | Basso | G06Q 10/101 |
| | | | 715/255 |

(Continued)

OTHER PUBLICATIONS

U.S. Appl. No. 13/842,430 (401 pages).

*Primary Examiner* — Fernando Alcon
(74) *Attorney, Agent, or Firm* — HIPLegal LLP; Judith Szepesi

(57) ABSTRACT

A method of facilitating audience interaction comprising determining a user-current state, based on at least one of user-entered input to be provided by a user on a device that is to be worn by the user and movement data to be received from the device. The determination of the user-current state includes determining a choice and a reaction of the user, and generating the user-current state, based on the determination.

22 Claims, 14 Drawing Sheets

(56) References Cited

U.S. PATENT DOCUMENTS

| | | | |
|---|---|---|---|
| 2013/0054357 A1 | 2/2013 | Mager et al. | |
| 2013/0097635 A1* | 4/2013 | Yerli | H04N 21/2187 725/37 |
| 2013/0152113 A1* | 6/2013 | Conrad | H04N 21/42201 725/12 |
| 2013/0298146 A1* | 11/2013 | Conrad | H04N 21/252 725/12 |
| 2014/0007147 A1* | 1/2014 | Anderson | H04H 60/33 725/9 |
| 2014/0075465 A1 | 3/2014 | Petrovic et al. | |
| 2014/0223475 A1 | 8/2014 | McIntire et al. | |
| 2015/0143392 A1* | 5/2015 | Silveira-Filho | H04H 60/33 725/10 |

\* cited by examiner

AUDIENCE INTERACTION SYSTEM

RELATED APPLICATION

The present application is a continuation-in-part of U.S. Utility application Ser. No. 13/842,430 filed on Mar. 15, 2013, which claims priority to U.S. Provisional Application 61/676,658 filed on Jul. 27, 2012, and incorporates both applications in their entirety by reference.

FIELD

The present application is related to measurement, and more particularly to using measurement to increase audience engagement.

BACKGROUND

Ensuring that the audience is engaged with a performance, and will continue to watch, remain engaged, and tune in next week, has been the goal of performance since ancient times.

One prior art method of measurement of remote audience response is by asking the audience to dial in, or send email or text messages indicating their views. This is useful to get an audience preference between various performers. For example, it is used on shows such as AMERICAN IDOL® and others. However, it provides little information, and generally only allows a user to choose one of multiple options presented.

Another prior art method of more precisely measuring audience response uses individual wireless keyboards that allow users to indicate their opinions or responses to what they are seeing. Generally, such methods require the provision of keypads, and the provisions of questions for the audience during the presentation. While this means that the audience no longer needs to dial in, it is still limited in what information it conveys.

Various methods of commenting on associated websites, or social media networks such as TWITTER® or FACEBOOK® can also be used to gauge audience response. However, only a small minority of vocal fans or opponents would usually take advantage of this, which means it provides only limited information.

Another prior art method of measurement of audience response in a theater or other in-person performance is to have human observers monitor the audience reactions for clapping, cheering, booing, and other actions. This has been used in live performance, such as theater, for hundreds of years. However, it is imperfect as it measures only the aggregate response of the audience at large.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1:
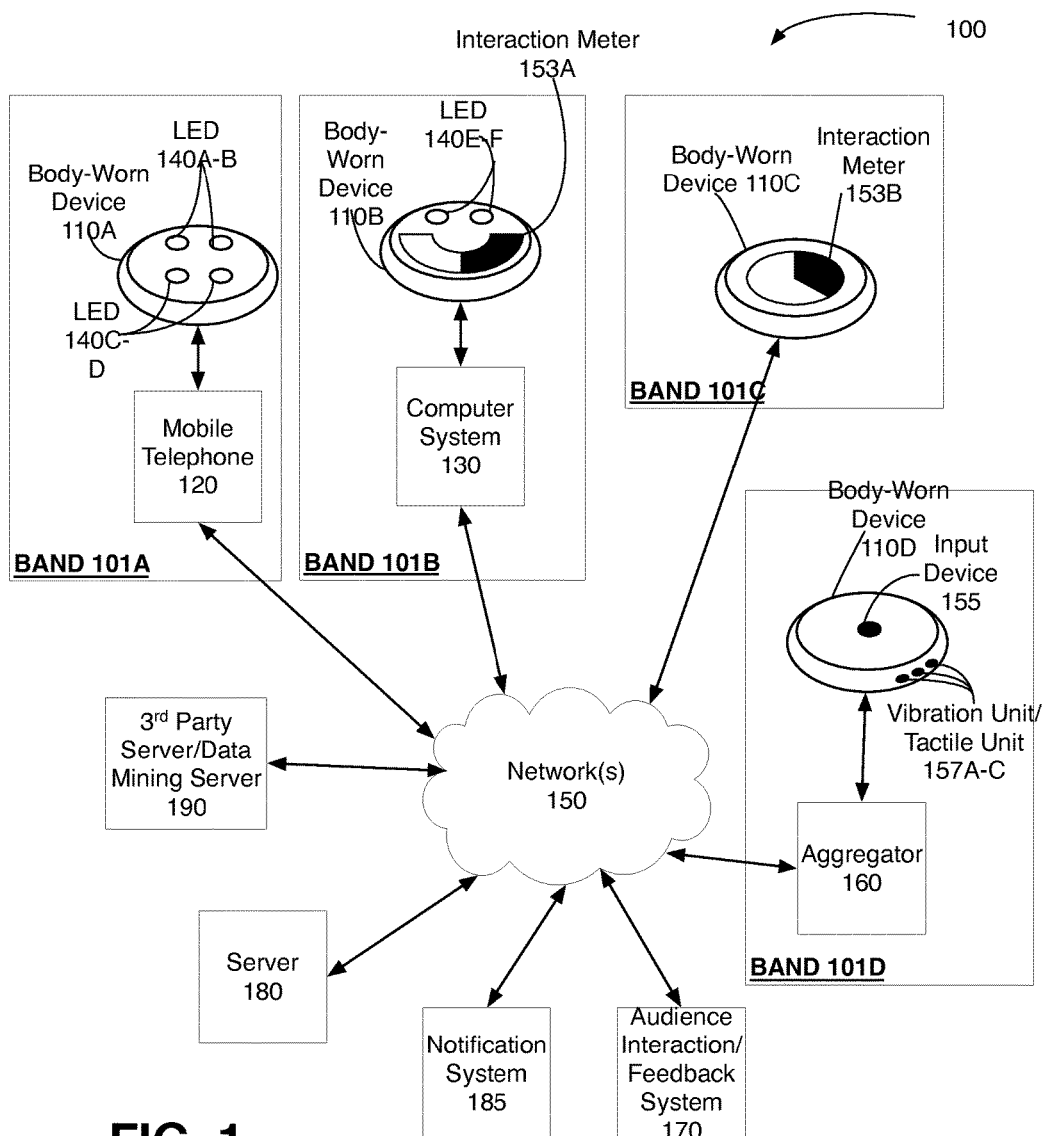
FIG. 1 is a diagram of one embodiment of an audience interaction system.

It is useful to point out the terminology that will be used in this description.

The term performance will be used to encompass any entertainment, sports, drama, or other activity to which an audience is invited, and which wishes to invite an audience response. For example, performances include variety shows, sitcoms, dramas, competitions whether sports or otherwise, political events, news broadcasts, debates, theater, etc. For simplicity, the present application will reference performance and entertainer(s), noting that entertainers in this context may include somber or factual presenters such as newscasters or politicians, sports performers, etc.

Reaction or reaction data refers to an emotional response of a user of the audience interaction system. The user will usually be a member of an audience that is watching or listening to a performance in real-time, in pseudo-real time, or at a different time. In another embodiment, a user may be a fan who is not actually watching, but who is being informed of the performance, and who also may have reactions to it. A reaction includes at least one of the user's engagement, excitement, boredom, fear, happiness, sadness, and other emotional responses. A reaction can be determined from movements performed by the user, such as but not limited to, clapping, booing, cheering, and other physical movements, as well as from physiological data such as body temperature, blood pressure, heart rate, etc.

A user's reaction data is determined from raw data, which can include in one embodiment movement data and physiological data, such as heart rate, sweating, tension, etc., can also be used as part of the raw data to calculate reaction, when available.

Aggregate reaction or aggregate reaction data refers to the accumulated reaction data of a group of users. The group of users may include the entire audience or relevant subgroups based on correlations between the users' reaction data.

Choice or choice data refers to a deliberate response of at least one user of the audience interaction system. Choice data refers to user-entered input that is deliberately provided by the user to the system, as opposed to a reaction, which is not deliberately provided. A choice can include a selection, preference, and/or prediction. A selection includes, but is not limited to, a user's favorite performance, team, entertainer, entertainment presentation, entertainment event, or the like. A preference includes, but is not limited to, the type of information that the user is interested in or would like to be notified of. A prediction includes, but is not limited to, a user's prediction about one or more events or occurrences that are related to a performance. For example, a prediction can be an audience member's selection of the entertainer that the audience member believes will be the winner.

Aggregate choice or aggregate choice data refers to the accumulated choice data of a group of users. The group of users may include the entire audience or relevant subgroups based on correlations between the users' choice data.

The user-current state is the user's current attitude toward the performance, determined based on a combination of the user's recent choices and reactions. In one embodiment, user-current state is based on a combination of the user's reactions and choices during a particular performance.

User-cumulative state is the evaluation of the user's attitude based on combinations of the user's reactions and choices over time, which are used to build up a preference profile for the user. The time used to determine user-cumulative state may be over hours or days, or over seasons of a particular performance, or may be as long as multiple years. For example, the user may have a cumulative state for all seasons of AMERICAN IDOL®. In one embodiment, there may be different user-cumulative states associated with different performances, or different performance types. For example, the user-cumulative state for football may be different than the same user's cumulative state for a TV show like PROJECT RUNWAY®. Additionally, in one embodiment, the user's state may be correlated with whether the user watched the performance in person, in real-time, time shifted, or did not observe the performance at all but rather used the audience engagement system to be informed of the performance.

Group-current state is the accumulated user-current states of a group of users. The group of users may include the entire audience or relevant subgroups based on correlations between the users' user-current states and/or user-cumulative states.

Group-cumulative state is the accumulated user-cumulative states of a group of users, which may include the entire audience or relevant subgroups based on correlations between the user-current states and/or user-cumulative states.

Targeted user data refers to data that is provided to one or more users of the system. Targeted user data includes data has been tailored to a particular user based on that user's user-current state and/or user-cumulative state. Targeted user data also includes data that has been tailored to a group of users based on that group's group-current state and/or group-cumulative state. Targeted user data includes, but is not limited to, historical information about an entertainer or performance. Targeted user data can include real or pseudo-real time information about an entertainer or performance. Of course, targeted user data may be targeted to all viewers of a particular performance, and does not imply that the data is not generic to all users. Additionally, targeted user data may, in one embodiment, include data about the performance sent to users who are not seeing the performance, to keep such users up-to-date, and enable them to remain engaged with the performance series. In one embodiment, the targeted user data for the non-watching user may be designed to be discreet so that a user who is otherwise engaged can obtain the data but is not interrupted, or embarrassed.

Feedback refers information that is presented to the entire audience. In one embodiment, feedback enables to entertainers and/or performance-related personnel to tailor the information that is presented to an entire audience (including those audience members that are not using the audience interaction system) based on responses obtained from less than all of the members of the entire audience (i.e., the members using the audience interaction system).

A band refers to the user-worn part of an audience interaction system. The band is used to collect, measure, process, provide, and/or output raw data, deliberate user-entered inputs, reaction data, choice data, user-current states, user-cumulative states, group-current states, group-cumulative states, and/or targeted user data of one or more users of the system. In one embodiment, the band is also capable of providing data to the other parts of the audience interaction system for further processing.

In one embodiment, a motion-sensing body-worn device that is not a specially made device, e.g. a body-worn device such as the UP™ wristband by JAWBONE™, the FUEL-BAND™ by NIKE™, or another general system. A motion-sensing body-worn device can also be a clip-on device, an armband, an earring, a necklace, a small device that is surgically placed under a user's skin, or a smart phone or similar device that is carried or worn by the user. Although the term "band" will be used for simplicity, it should be understood that any body-worn device capable of capturing the user's reactions and choices may be used.

In one embodiment, a motion-sensing body-worn device is used together with a mobile telephone and/or other computing system as the user device. In one embodiment, the band is an extended band, consisting of a body-worn device in connection with a mobile device such as a smart phone or tablet computer. One example of such an extended band is described in co-pending application Ser. No. 14/255,923, entitled An Extended Band System, assigned to the assignee of the present invention and incorporated herein by reference.

The present system is an audience interaction system, to obtain information about audience interactions with a performance and to increase audience engagement. In one embodiment, the audience interaction system is available whether an audience is present at the location of a performance or not. For example, the in-person audience at AMERICAN IDOL® may be provided with bands as they enter the performance. In one embodiment, the audience interaction system can also be used with a remote TV audience that is viewing from one or more remote locations, such as their homes. In one embodiment, AMERICAN IDOL® may sell branded bands. In one embodiment, for the portion of the fans of a performance series that cannot participate, an extended band may provide discreet information about the performance, and the ability to remain engaged, and continue to participate as a member of the audience, even when other matters prevent the user from actually being in the audience.

The data collected by the audience interaction system may include in-person audience members as well as remote audience members. This may enable organizers to view the difference in interactions, and potentially adjust a performance to improve the experience of those users that are experiencing the performance on-site or from a remote location. In one embodiment, the system may be available to those audience members that are experiencing a recorded version of the performance, such as viewers of a recorded television show. In one embodiment, the system may also be available to those who cannot watch, but are fans. In one embodiment, the system includes the user's viewing status (e.g. in person, remotely, or non-viewing) as part of the user current state.

The system has many benefits. It makes performances richer through intuitive live audience interaction. In one embodiment, the performance can present feedback to the audience to add another dimension. In one embodiment, the performance is adaptively changed, based on the measured data, to account for what will effectively get desired responses from the audience. It an also prompt the user to engage further with the performance, and enables someone who likes the performance but is unable to attend to remain engaged.

In one embodiment, the system can receive user choices, about events that will occur in the performance and use the choices to determine the type of information that should be provided to the users, performance-related personnel, or other third parties. For example, in an episode of AMERICAN IDOL®, the performance's creators can establish a competition for the viewers to enrich the viewing process. In this example, the competition would ask the viewers to predict the winner of AMERICAN IDOL®, or the performer with the highest score in this round, or the judge who will give the highest scores of the night, etc. Using choices and audience reactions, the creators of AMERICAN IDOL® can provide the viewers, via the bands or other display devices, with information about the accuracy of their choices, their relative accuracy compared to other viewers, whether they are winning or losing, etc.

Prior art systems require users to manually tediously interact, with a feedback system such as a telephone or special wireless keyboard. Using this system, a user just wears a band and acts normally—cheers, makes gestures, etc. In one embodiment, the system also allows the users to use specific gesture commands. In one embodiment, the user can also use the band, to provide deliberate user-entered inputs about his choices, so that the system can, for example, provide that user with targeted user data.

FIG. 1 is a diagram of one embodiment of an audience interaction system 100. Audience interaction system 100 includes a plurality of bands 101A-D.

Each band shown in FIG. 1, bands 101A-D, is used to show some possible embodiments of a band. In one embodiment, body-worn device 110A works in conjunction with mobile telephone 120 as extended band 101A. Body-worn device 110B, in one embodiment, works together with computer system 130 or a network portal (not shown) as extended Band 101B. Body-worn device 110C, in one embodiment, works directly with network(s) 150 as Band 101C. Body-worn device 110D works in conjunction with aggregator 160 as Band 101D.

Body-worn devices 110A-D are described as wrist-worn devices, however the implementation may be in any body-worn format that is capable, at least, of detecting movement. In a preferred embodiment, each body-worn device 110A-D is worn on a wrist or an arm, in a pocket, or around a neck. However, another location of the body may be utilized.

In one embodiment, body-worn device 110A communicates with mobile telephone 120, computer system 130, network 150, and/or aggregator 160 via a wireless communication mechanism such as Bluetooth, Low Energy Bluetooth, Near field communication (NFC), or other wireless communication. Mobile telephone 120 or computer system 130, then communicates with aggregator 160, server 180, notification system 185, and/or audience interaction output/feedback system 170, via at least one wired and/or wireless network(s) 150, such as WiFi, cellular, or other network.

In one embodiment, body-worn device 110C communicates directly with network(s) 150, by connecting over a wired connection (such as an Ethernet connection) or over a wireless connection (such as Wi-Fi or a cellular network).

Aggregator 160 can connect to network(s) 150, which then enables body-worn device 110D to connect to server 180, notification system 185, and/or audience interaction output/feedback system 170.

While only one body-worn device is shown in each band 101A-D, two or more body-worn devices 110A-D may be coupled through a single mobile telephone 120, computer system 130 (or network portal), network(s) 150, or aggregator 160.

Bands 101A-D, in one embodiment, may include sensors (not shown) to collect movement data and/or physiological data of users. Such movement and physiological data is referred to as "raw data," which is processed to generate reaction data. In one embodiment, motion commands are also identified by bands 101A-D. In addition to motion commands, in one embodiment, bands 101A-D collect user-entered inputs. The motion commands and user-entered inputs, when processed, generate user choice data.

In one embodiment, the processing of raw data and user-entered inputs may be done by one or more of band 101A-D, mobile telephone 120, computer system 130, aggregator 160, and/or server 180.

In one embodiment, aggregator 160 and/or server 180 process the collected data from a group of users. The collected data may be raw data/inputs or processed reactions/choices. In one embodiment, aggregator 160 and/or server 180 generates aggregate reaction data and an aggregate choice data for a group. In one embodiment, a group may be defined based on corresponding preferences, characteristics, reactions, or choices, location, age, or other factors.

In one embodiment, aggregator 160 generates different sets of aggregate reaction data and aggregate choice data based on the users wearing bands 101A-D and/or based on different subgroups within a group of users wearing bands 101A-D. In one embodiment, there may be multiple aggregators 160 that each generates a particular set of aggregate interaction data, based on subgroups.

In one embodiment, mobile device 120, computer system 130, aggregator 160, and/or server 180 process reaction data and choice data into a user-current state. In one embodiment, the user-current state includes data over time, not an instant snapshot, e.g. the user's current state reflects the user during the current period. In one embodiment, the system also generates a user-cumulative state based on the newly calculated user current state, and historical user state data.

In one embodiment, the system also generates group-current states. In one embodiment, the system generates group-current state(s) from the user-current states of group members. Additionally, in one embodiment, the system generates a group cumulative state.

Aggregator 160 or server 180, in one embodiment, provides the user-current states, the user-cumulative states, the group-current states, and/or the group-cumulative states of the users of bands 101A-D to notification system 185, data mining server 190, and/or audience interaction/feedback system 170.

Notification system 185, in one embodiment, acquires targeted user data for each user of bands 101A-D, based on the provided user-current states, user-cumulative states, group-current states, group-cumulative states and/or viewing status of respective users of bands 101A-D. Notification system 185, in one embodiment, provides targeted user data to bands 101A-D for presentation to the respective users. In one embodiment, interaction meters, as described below, are used for presenting data to the users of bands 101 A-D.

Targeted user data, in one embodiment, is provided to the bands. In one embodiment, the data may be provided directly, via notification system 185, via mobile telephone 120, via aggregator 160, or via network(s) 150.

In one embodiment, notification system 185 also provides targeted user data to data mining server 190, and/or audience interaction/feedback output system 170 for further processing. In one embodiment, notification system 185 provides the user viewing status, user-current states, the user-cumulative states, the group-current states, and/or the group-cumulative states to data mining server 190, and/or audience interaction/feedback output system 170 for further processing. In one embodiment, bands 101A-D provide the targeted user data to data mining server 190, and/or audience interaction/feedback output system 170 for further processing. In one embodiment, bands 101A-D also provide the user-current states, the user-cumulative states, the group-current states, and/or the group-cumulative states to data mining server 190, and/or audience interaction/feedback output system 170 for further processing.

Audience interaction/feedback output system 170, in one embodiment, is used to present data based on the information from the bands to audience members, entertainers, performance-related personnel, and/or to other third parties. This may be done in real time or pseudo-real time, enabling the performers to potentially adjust their actions during the performance itself. The output provided may be visual, audio, and/or tactile outputs. In one embodiment, audience interaction/feedback output system 170 may in turn connect to a server, computer, or mobile device associated with the performers or other related personnel, for outputting the data.

In one embodiment, Audience interaction/feedback output system 170 provides feedback to an audience. Feedback, in one embodiment, is provided to the entire audience by notification system 185 and/or data mining server 190 based on the user-current states, user-cumulative states, group-current states, group-cumulative states, and/or targeted user data of at least one member of an audience that is wearing one of bands 101A-D.

For example, feedback can be used by a network to select a particular type of commercial, based on a subgroup of audience members wearing bands 101A-D, to show an entire audience during a commercial break of a performance. For example, a network may choose to show a commercial for a BMW® automobile to every audience member (whether they have a band or not) during the commercial break of AMERICAN IDOL® based on the group-current state of a subgroup of audience members that are between ages 12-34 and that are wearing bands 101A-D. In one example, a commercial will only be shown to every audience member if the group-current state of a subgroup of that audience that is wearing bands 101A-D satisfies certain pre-determined criteria, as selected by the network.

Feedback may be used to incent an influential subgroup of an audience to encourage other members of the audience (including those not wearing bands 101A-D) to engage more actively with a performance.

In one embodiment, feedback is presented using visual, audio, and/or tactile outputs, as is well understood in the art. For example, an audience member (including one without a band 101A-D) experiencing a performance on his television would have feedback provided to him on his television. In one example, feedback may be audio outputs such as pre-recorded laugh tracks, pre-recorded clapping, and the like.

Audience interaction system 100, in one embodiment, can optionally include $3^{rd}$ party server or data mining server 190. In one embodiment, data mining server 190 further processes user-current states, user-cumulative states, group-current states, group-cumulative states, and/or targeted user data of users of bands 101A-D. In one embodiment, data that is processed by data mining server 190 enables performance-related personnel to better understand how an audience responds to a performance or to an entertainer.

Bands 101-A-D, in one embodiment, can present user-current states, user-cumulative states, group-current states, group-cumulative states, targeted user data, and/or feedback to respective users of bands 101A-D. In one embodiment, this is done using an interaction meter. The feedback may use the bands to present color, music, vibration, and/or text. In one example, a user of band 101A may be presented with the states, the targeted user data, and/or the feedback via audio, visual, and/or tactile outputs that are incorporated into mobile telephone 120, as well as, via Light-Emitting Diodes (LEDs) 140A-D of body-worn device 110A. The bands may include various combinations of LEDs 140, interaction meters 153, vibration/tactile units 157. Other methods of providing feedback to the user, via the band or an associated mobile device may be used. In one embodiment, the feedback may be tailored to the user's viewing status, as well. For example, an audience member who is watching a performance live may get a more vivid or loud feedback than an audience member who is watching at home. A user who is not observing the performance but has asked to be informed may be given different feedback, which is optimized for that user's viewing status.

Figure 2A:
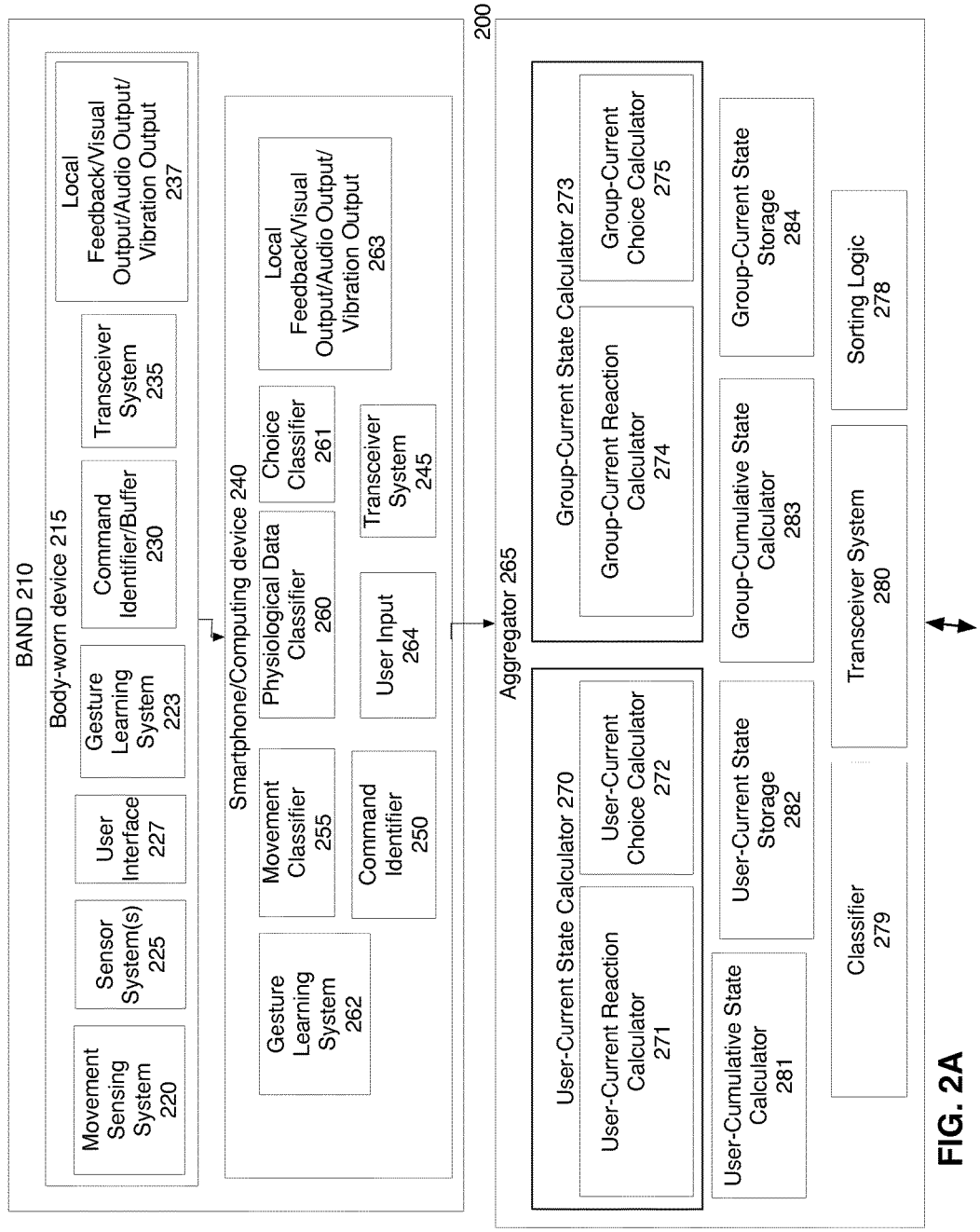
FIG. 2A-2B are the block diagram of one embodiment of an audience interaction system.
Figure 2B:
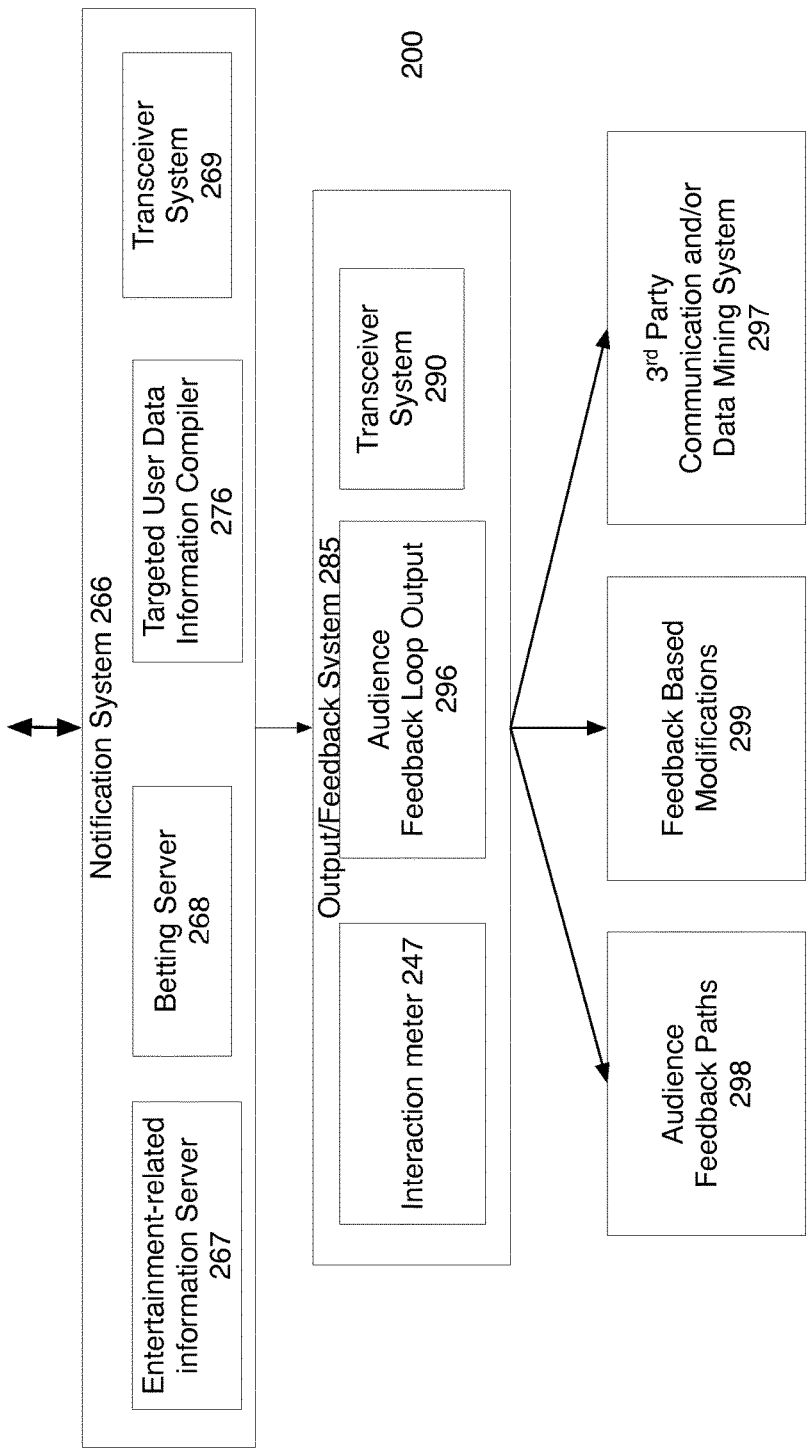

FIG. 2A-2B are a block diagram of one embodiment of an audience interaction system 200. In one embodiment, band 210 includes body-worn device 215 and smartphone/computing device 240. Body-worn device 215 includes, in one embodiment, movement sensing system 220. Movement sensing system 220 may range from a simple tri-axis linear accelerometer to a complete inertial measurement unit (with linear accelerometer, gyroscope and/or magnetometer). In one embodiment, movement sensing system is used to monitor the physical movements of a user of band 210.

Body-worn device 215, in one embodiment, includes sensor system(s) 225, which may include skin and ambient temperature, heart rate, blood pressure, and other physiological signal sensors. In one embodiment, sensor system(s) 225 may further include a microphone to monitor sounds, such as cheering, clapping, talking, etc.

Body-worn device 215, in one embodiment, also includes user interface 227. User input interface is provided on body-worn device 215, and can be in the form of any mechanism that enables a user of band 210 to provide a deliberate user-entered input to audience interaction system 200. In one embodiment, user input 227 can be a button, a keyboard, a touch screen, or other input that is located on band 210.

Body-worn device 215, in one embodiment, includes a command identifier/buffer 230. In one embodiment, command identifier/buffer 230 identifies motion commands based on movement information, from movement sensing system 220. Motion commands are one way to provide user input, using deliberately performed motions.

In one embodiment, motion commands are used to designate a deliberate movement as a particular type of deliberate user-entered input. For example, command identifier/buffer 230 may be configured to recognize a user's act of drawing a circle in the air as a first deliberate input, and the user's act of touching his ear lobe as a second deliberate input that is different from the first input.

In one embodiment, a user of band 210 can teach body-worn device 215 motion commands that the user wants to use to communicate. In one embodiment, this is done through gesture learning system 223. In one embodiment, a user of band 210 may optionally alter one or more of movement sets, based on their own preferences. In one embodiment, existing movement sets may be reassigned. In one embodiment, a user may teach gesture learning system 223 a new movement by performing that movement when band 210 is on a gesture learning setting.

Gesture learning system 223, in one embodiment, can also be used by a user of band 210 to provide reaction data based on the movements that the user teaches gesture learning system 262. For example, clapping is a different motion depending on how the user claps. The gesture learning system 223 an learn the user's movements, and their correlation to clapping, cheering, etc.

Body-worn device 215, in one embodiment, includes local feedback/visual output/audio output/vibration output 237, collectively known as output 237. In one embodiment, output 237 is used by band 210 to present user-current state, user-cumulative state, group-current state, group-cumulative state, targeted user data, and/or feedback to a user of band 210. Output 237 may be used to present interaction meters, as described below in FIGS. 7A-7D.

In one embodiment, body-worn device 215 may receive data to be presented via output 237 through transceiver system 235. In one embodiment, smartphone/computing device 240, aggregator 265, notification system 266, output/feedback system 285, audience feedback paths 298, feedback based modifications 299, and/or data mining system 297 use transceiver system 235 to provide body-worn device 215 with data.

In one embodiment, output 237 can be visual, audio, and/or tactile output, as is well understood in the art. In one embodiment, system 200 uses output 237 to provide feedback to users so as to coordinate synchronized acts that are to be performed by one or more members of an audience experiencing a performance. For example, output 237 can be used to signal that a group of audience members should perform the "wave" that is commonly performed at sporting events. In one embodiment, the system includes the viewing status of the users, to ensure that local viewers are prompted to do something like the wave, while users watching remotely are triggered for another action. In one embodiment, viewer status may be determined based on data from sensor systems 225. In one embodiment, one or more of: location sensor (global positioning system (GPS), network triangulation system, wireless location, etc.); microphone, accelerometer, and other sensors are used to determine whether the user is viewing the performance at the performance location, viewing the performance remotely, or not viewing the performance.

In one embodiment, output 237 can also be used to promote interaction among a group of users wearing bands similar to band 210. For example, an LED-form of output 237 enables audience members to immediately see their own user-current state, as well as, the user-current states of other audience members based on the colors that emanate from the LEDs of other audience members' bands. For example, voting for a particular entertainer in a talent show, such as AMERICAN IDOL® could display a color corresponding to the entertainer. Thus, there would be output of the users' choices that can be experienced by all members of the audience, the performers, and, the performance-related personnel. This would be designed to induce users to become more engaged in the performance.

In one embodiment, the raw data collected by movement sensing system 220, and/or sensor system(s) 225, as well as, the user-entered inputs collected by user input 227 and command identifier 230 can be provided to smartphone/computing device 240 and/or to aggregator 265 for further processing.

In one embodiment, body-worn device 215 does not process the sensor and input data. In one embodiment, body-worn device 215 provides buffered raw data to smartphone/computing device 240 and/or aggregator 265 for processing. In one embodiment, body-worn device 215 performs partial processing of at least some of the data, prior to providing the data to smartphone/computing device 240 and/or aggregator 265.

Smartphone/computing device 240 includes, in one embodiment, a command identifier 250. Command identifier 250 is used to identify deliberate gesture commands, based on data from movement sensing system 220. In one embodiment, one or both of command identifier 250 in smartphone/computing device 240 or command identifier/buffer 230 in body-worn device 215, are present in system 200. In one embodiment, a system may not permit gesture-based commands, in which case the system 200 may not include either logic.

In one embodiment, smartphone/computing device 240 optionally includes gesture learning system 262. In one embodiment, gesture learning system 262 interacts with gesture learning system 223, to enable a user to add new gesture commands, or modify existing gesture commands.

In one embodiment, smartphone/computing device 240 includes movement classifier 255. Movement classifier 255, in one embodiment, classifies data obtained from movement sensing system 220 and sensor systems 225 to determine reaction data. Physiological signal classifier 260 of smartphone/computing device 240 utilizes raw data from one or more physiological signals that were monitored by sensor system(s) 225 to determine the reaction of a user. In one embodiment, the movement classifier 255 and physiological signal classifier 260 output one of a preset range of reactions that my be associated with the user.

In one embodiment, smartphone/computing device 240 can, optionally, include user interface 264. User interface 264 enables the user to enter choices into the system. In one embodiment, user interface 264 may replace user interface 227 in body-worn device 215. Alternately, both may be present in the system.

In one embodiment, smartphone/computing device 240 includes choice classifier 261. In one embodiment, Choice classifier 261 utilizes one or more deliberate user-entered inputs provided by a user of band 210, via user interface 227/264 or command identifier 230/250 to determine the user's choices. Choice classifier 261 associates the selection with the appropriate performer, portion of the show, etc. For example, command identifier may identify the user as giving a thumbs up to a performer. Choice classifier 261 classifies that input as a selection of the particular performer who was active at the time the thumbs up was received. Thus, choice classifier uses the user-entered input or motion data identified by the command identifier 230/250 to determine the user's choices.

In one embodiment, choice classifier 261 determines, from one or more deliberate inputs, a user's prediction about one or more events or occurrences that are related to an entertainer or a performance. For example, one or more deliberate inputs could be used to determine a user of band 210's prediction about an outcome of a performance, or a prediction about a behavior of an entertainer, or any other similar choices that reflect a user's predictions. In one embodiment, the system may not include the classifier logic 261, if the user's choice inputs are designed such that no ambiguity exists regarding the identity of the performer, or similar questions in user inputs.

Smartphone/computing device 240, in one embodiment, includes local feedback/visual output/audio output/vibration output 263, collectively known as output 263. Output 263 provides the richer output interface provided by a mobile device such as a smartphone, and enables the use of a screen as well as colors, sounds, vibrations, and other forms of output. The output 263 may also enable a remote non-viewing user to be provided relevant data about the performance. In one embodiment, the relevant data may be provided via a messaging system such as short messaging system (SMS), multimedia messaging system (MMS), or a custom application system. The user may be provided information about, for example, how individual performers are doing, the overall audience mood, etc. The remote non-viewer may also be given the opportunity to provide feedback, as described in more detail below.

In one embodiment, raw data, user-entered inputs, reaction data, and/or choice data obtained by body-device 215 and/or smartphone 240 is provided to aggregator 265, using transceiver system 245. In one embodiment, aggregator 265 receives processed data, e.g. the user's reaction and choice data only. In another embodiment, the aggregator 265 may be used for processing.

In one embodiment, aggregator 265 uses classifier 279 to classify raw data and/or user-entered inputs into reaction data and/or choice data.

Aggregator 265, in one embodiment, includes a user-current state calculator 270. User-current state calculator 270 includes a user-current reaction calculator 271 and a user-current choice calculator 272, in one embodiment. User-current state calculator 270, in one embodiment, processes a user-current state for a user of band 210 based on processed reaction data and processed choice data, that are provided by user-current reaction calculator 271 and user-current choice calculator 272, respectively.

User-current reaction calculator 271, in one embodiment, processes reaction data to provide an evaluation of one or more reactions of a user of band 210 in real time or in pseudo-real time.

User-current choice calculator 272, in one embodiment, processes choice data to provide an evaluation of one or more choices of a user of band 210 in real-time or pseudo-real time.

In one embodiment, processed reaction data of calculator 271 and processed choice data of calculator 272 are provided to user-current state calculator 270, which further processes them into a user-current state for a user of band 210.

Aggregator 265, in one embodiment, includes user-current state storage 282 and user-cumulative state calculator 281. In one embodiment, user-current state storage 282 stores user-current state as determined by user-current state calculator 270. In one embodiment, stored user-current states are provided to user-cumulative state calculator 281, which combines the user-current state data with one or more previously stored user-current states to calculate a user-cumulative state.

In one embodiment, aggregator 265 also includes sorting logic 278. Aggregator 265, in one embodiment, is configured to be provided with reaction data, choice data, user-current states, and/or user-cumulative states. In one embodiment, sorting logic 278 is used by aggregator 265 to sort users of bands 210 into groups based on correlations between the users' reaction data, choice data, user-current states, and/or user-cumulative states. In one embodiment, a correlation is determined based on predetermined criteria, such as, reaction data, choice data, user characteristics, etc.

In one embodiment, the groupings created by sorting logic 278 are provided to group-current state calculator 273. In one embodiment, group-current state calculator comprises group-current reaction calculator 274 and group-current choice calculator 275. In one embodiment, group-current state calculator 273 processes a group-current state for members of a group. Group-current reaction calculator 274, in one embodiment, processes reaction data of a group of users.

In one embodiment, aggregate reaction data that is processed by group-current reaction calculator 274 is based only on correlating reaction data of users in a group created by sorting logic 278, and not on the non-correlating reaction data of the group's users. In another embodiment, aggregate reaction data includes non-correlating reaction data of the group's users.

In one embodiment, group-current choice calculator 275 processes choice data of a group of users to provide an evaluation of one or more choices of the group in real-time or pseudo-real time. In one embodiment, calculator 275 aggregates the choice data of the group in an aggregate choice data.

In one embodiment, aggregate choice data that is processed by group-current choice calculator 275 is based only on the correlating choice data of users in a group created by sorting logic 278, and not on the non-correlating choice data of the group's users. In another embodiment, the non-correlating choice data of the group's users is included as well.

In one embodiment, group-current state calculator 273 processes the group current reaction data and the group current choice data, into a group-current state for a group of users. In one embodiment, group-current state calculator 273 is provided with user-current states of a group directly from sorting logic 278, which calculator 273 processes into a group-current state for the group.

Of course, one of skill in the art would understand that there may be many groups, and group-current state calculator 273 may calculate reaction and choice data for a plurality of groups. In one embodiment, there may be a separate processing thread associated with each grouping, where group data is calculated.

Aggregator 265, in one embodiment, optionally includes a group-current state storage 284 and a group-cumulative state calculator 283. In one embodiment, group-current state storage 284 stores group-current state. In one embodiment, a stored group-current state is provided to group-cumulative state calculator 283, which combines a current group-current state with one or more previously stored group-current states to aggregate a group-cumulative state.

In one embodiment, user-current states, user-cumulative states, group-current states, and/or group-cumulative states that were determined by aggregator 265 are provided, via transceiver 280, to notification system 266.

Notification system 266 in one embodiment includes entertainment-related information server 267, betting server 268, targeted user data information compiler 276, and transceiver 269.

In one embodiment, targeted user data—customized information provided to the user by the system—is generated by targeted user information compiler 276. It uses entertainment-related information server 267 and betting server 268 to create targeted user data based on a user's user-current state, user-cumulative state, group-current state, and/or group-cumulative state.

In one embodiment, entertainment-related information server 267 is a database of information that can be accessed, via a wireless or wired connection, to obtain information related to a performance or an entertainer. In one embodiment, entertainment-related server 267 can be a storage management system, such as a database or cloud storage server that contains information about an entertainer or/and a performance.

Entertainment-related information can, in one embodiment, include information about the history of a performance, information about the life of an entertainer, information about future performances, information about real time or pseudo real-time occurrences during a performance, etc.

In one embodiment, betting server 268 is a database of information that can be accessed, via a wireless or wired connection, to obtain information related to the predictions of users. In one embodiment, betting server 268 can be a storage management system, such as a cloud storage site, that contains all event-prediction information that is related to a performance or an entertainer.

Event-prediction information is the statistical analysis of expected outcomes of performances or competitions, and the calculation of a user's odds, and accuracy of the user's predictions.

In one embodiment, output/feedback system 285 is used to data to a user of band 210 and/or to others. The others may be audience members without a band, performers, participants, or others. The data may include user-current states, user-cumulative states, group-current states, group-cumulative states, entertainment related information, and/or targeted user data.

Output/feedback system 285, in one embodiment, includes an interaction meter 247. In one embodiment, interaction meter 247 provides a visual, audio, and/or tactile output of states. In one embodiment, interaction meter 247 also provides visual, audio, and/or tactile output of a user's or a group's targeted user data. Various embodiments of exemplary interaction meters 247 are shown in FIGS. 7A-7D.

Audience feedback loop output 296, in one embodiment, determines whether a particular type of data should be provided to the audience. If so, in one embodiment, feedback is based on criteria provided by performance-related personnel or by a third party. For example, a network may provide criteria that states that if a particular group (for example viewers between ages 12-34) are excited during a performance for over 10 minutes, a pre-determined advertisement should play.

In one embodiment, feedback is provided from entertainment related information server 267 and/or betting server 268. In one embodiment, feedback is provided to an audience (including those not wearing band 210) after transceiver system 290 provides the approved messages to one or more audience feedback paths 298. In one embodiment, audience feedback loop output 296 also allows for the provision of user-current states, user-cumulative states, targeted user data, group-current states, group-cumulative states, and/or targeted user data via transceiver system 290 to one or more audience feedback paths 298.

Audience feedback paths 298, in one embodiment, include a visual display at the performance location, a visual display on a display device in conjunction with a live performance, an overlay or window displayed on a screen associated with the performance, audio feedback, feedback via bands, or via other feedback paths.

Feedback based modifications 299 enable a performance to be adjusted, in response to the feedback. In one embodiment, selections such as music, laugh track, clap signs, etc. may be adjusted based on the feedback in real time or in pseudo-real time. In one embodiment, a performance may be changed, either in an improv style or by selecting from a plurality of potential options, based on real-time or pseudo-real-time audience feedback.

In one embodiment, feedback based modifications 299 work in conjunction with audience feedback loop output 296 to allow for messages to be sent directly to the audience. In one embodiment, audience feedback loop output 296 may be controlled automatically based on user states, by performance-related personnel, or a third party. In one embodiment, the feedback may be to prompt audience interaction.

For example, a group of sports fans that are using bands and are attending the performance may be provided with messages informing them to raise their bands at a specific time, so that LED outputs on their bands are used to create a shape, such as a wave, or more complex shapes. In one embodiment, the LED outputs on the bands may be used to draw complex images, with the assistance of the audience. The audience would be engaged and in one embodiment, the audience feedback would show the effect of their actions as well. In one embodiment, such audience actions may be transmitted to users who are remotely viewing or not currently viewing the performance.

In one embodiment, information obtained and/or processed by output/feedback system 285 is also provided to data mining system 297. This system 297 allows for further analysis of the data.

One of skill in the art would understand that the configuration described above is merely exemplary. The various logic blocks may be shifted between devices. For example, aggregator 265 may be removed or replaced by a computer system or server device. Additionally, while the systems are described separately, one of skill in the art would understand that the elements may be implemented on a single server system or similar device.

Figure 3:
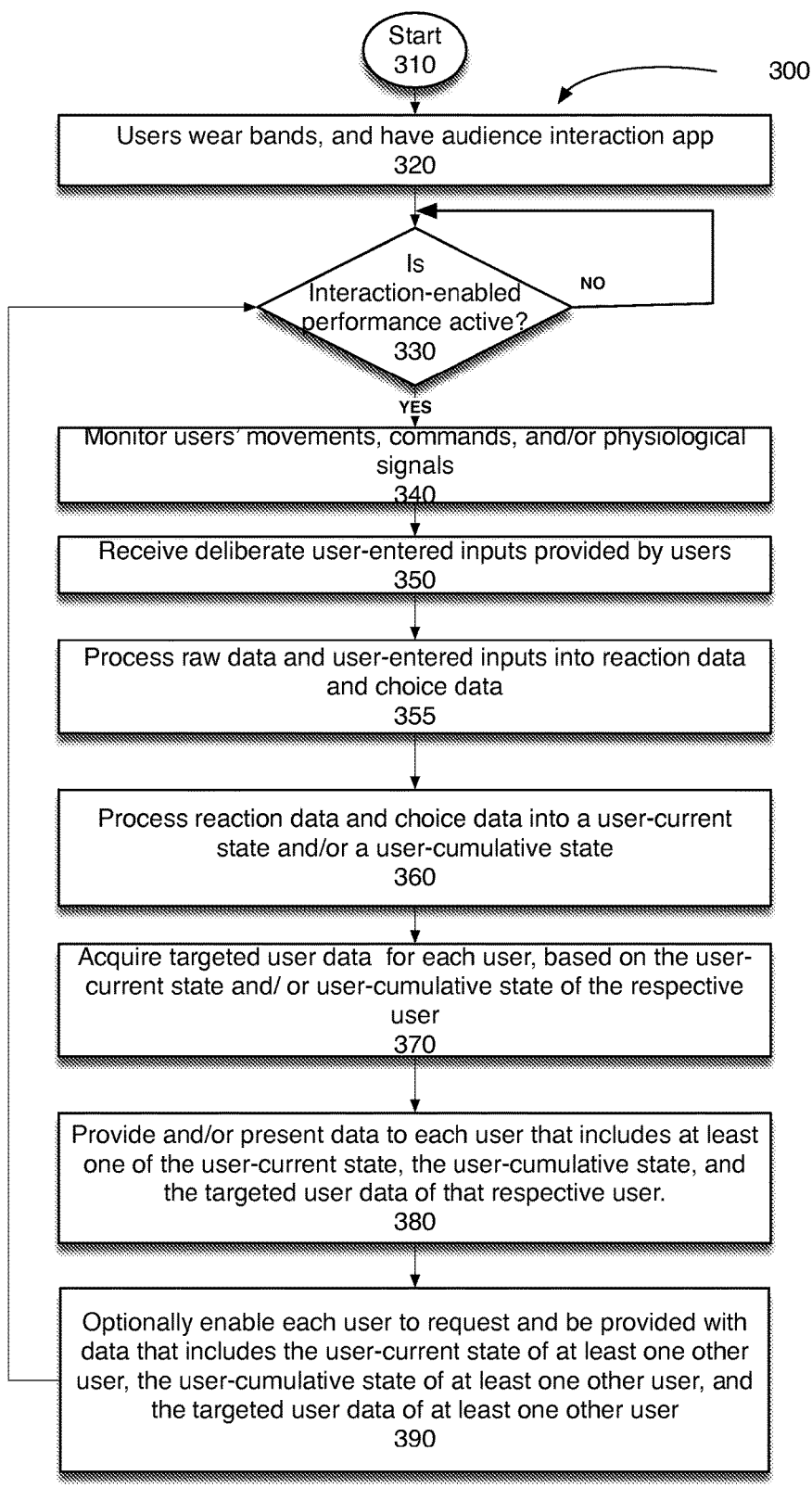
FIG. 3 an overview flowchart of one embodiment of using measurement to facilitate audience interactions.

FIG. 3 is one embodiment of an overview flowchart illustrating a process 300 of using measurement to facilitate audience interactions.

Process 300 begins at block 310. At block 320, one or more users wear the bands, and each of the users has an audience interaction application on their respective bands or an associated smartphone or other mobile device. At block 330, the process determines whether the user is interacting with an interaction-enabled performance. In one embodiment, if one or more of the users are physically present at a performance, the bands may be automatically activated. In one embodiment, the bands may be activated by sending out a notification to all audience members to activate their respective bands.

If the users are viewing the performance on the Internet, television, or via other remote viewing options, in one embodiment, the performance may send out a signal, to indicate that the bands should be enabled. In one embodiment, for non-viewing users, the system may send out a notification, enabling them to activate the system, if they wish to. A signal may be sent to the bands to automatically enable them. In one embodiment, each of the users may manually indicate, on their respective bands, that they are watching or interested in an interaction-enabled performance. In one embodiment, the bands may be associated with one particular performance, e.g. AMERICAN IDOL™, and whenever that performance is being broadcast, the bands are activated. In one embodiment, the bands may be associated with a network, or a plurality of performances. In one embodiment, each of the users may select the performances with which they want their respective bands to be associated, e.g. those performances that a user watches/cares about. In one embodiment, the users' bands include microphones that may be used to determine the user's viewing state, e.g. whether the users are watching one or more performances that are affiliated with the users' respective bands.

If the interaction-enabled performance is not occurring, process 300 re-determines, until an interaction-enabled performance is available. In one embodiment, although this is shown as a loop, the process is an interrupt driven process, with the band in low power mode until a signal, timer, or user action triggers the validation of the interaction-enabled performance. If the interaction-enabled performance is occurring, process 300 continues to block 340.

At block 340, the bands monitor the users' movements, command signals, and/or physiological signals. In one embodiment, this is done through one or more sensors in the band, and optionally in a mobile device associated with the band, such as a smartphone.

At block 350, in one embodiment, one or more of the bands prompt the users to deliberately provide user-entered inputs into their respective bands. This may be done, in one embodiment, via a user interface. In one embodiment, this may be done via a gesture command.

At block 355, non-command motions, and/or physiological signals are processed into reaction data, and the user-entered inputs, the motion commands are processed into choice data for each user.

In one embodiment, at block 360, the system processes each user's reaction data and choice data to calculate a user-current state and/or user-cumulative state. In one embodiment, this may be done on the band. Alternatively, this may be done on the smartphone or other computer device associated with the user, at an aggregator, or on a server.

At block 370, the band uses the user-current state and/or user-cumulative state to receive targeted user data for each user. This data may be pushed by the server, or pulled by the user's band or smartphone.

At block 380, in one embodiment, feedback is provided to the user. The feedback may include one or more of: the user-current state, the user-cumulative state, and/or the targeted user data. In one embodiment, targeted data is also provided to the user. The targeted data may provide relevant information. This information may be different for a non-viewing user.

At block 390, a user may request the feedback data associated with one or more other users. In another embodiment, the system may automatically provide the feedback data associated with a group to a user. For example, the user may set up a "friends" group with a number of other users that have the band. The system can then share the state data between bands. In one embodiment, this is done through the server. In another embodiment, this is done on a peer-to-peer basis between the users. In one embodiment, for peer-to-peer data sharing, the system uses the smartphone or other computer device. In one embodiment, for peer-to-peer sharing the system uses a local area network, such as BLUETOOTH™.

In one embodiment, a first user of a band (hereinafter "requesting user") will request information about one or more other users (hereinafter "requested user") via a user-entered input. If the requested user gives permission to share, the requesting user's request will be approved and the requesting user will be provided with the data. In another embodiment, the sharing may be set up once, and then provide continuous sharing going forward.

The process then returns to block 330, to continue monitoring users and sharing data, until the interaction-enabled performance stops being active. One of ordinary skill in the art will recognize that the process is a conceptual representation of the operations used to create audience engagement with a performance. The specific operations of the process may not be performed in the exact order shown and described. For example, blocks 340, 350, and 370 are not dependent on each other, and therefore can be performed in any order or in parallel. The specific operations may not be performed in one continuous series of operations, and different specific operations may be performed in different embodiments. Furthermore, the process could be implemented using several sub-processes, or as part of a larger macro process. For instance, in some embodiments, the process is performed by one or more software applications that execute on one or more computers.

Figure 4:
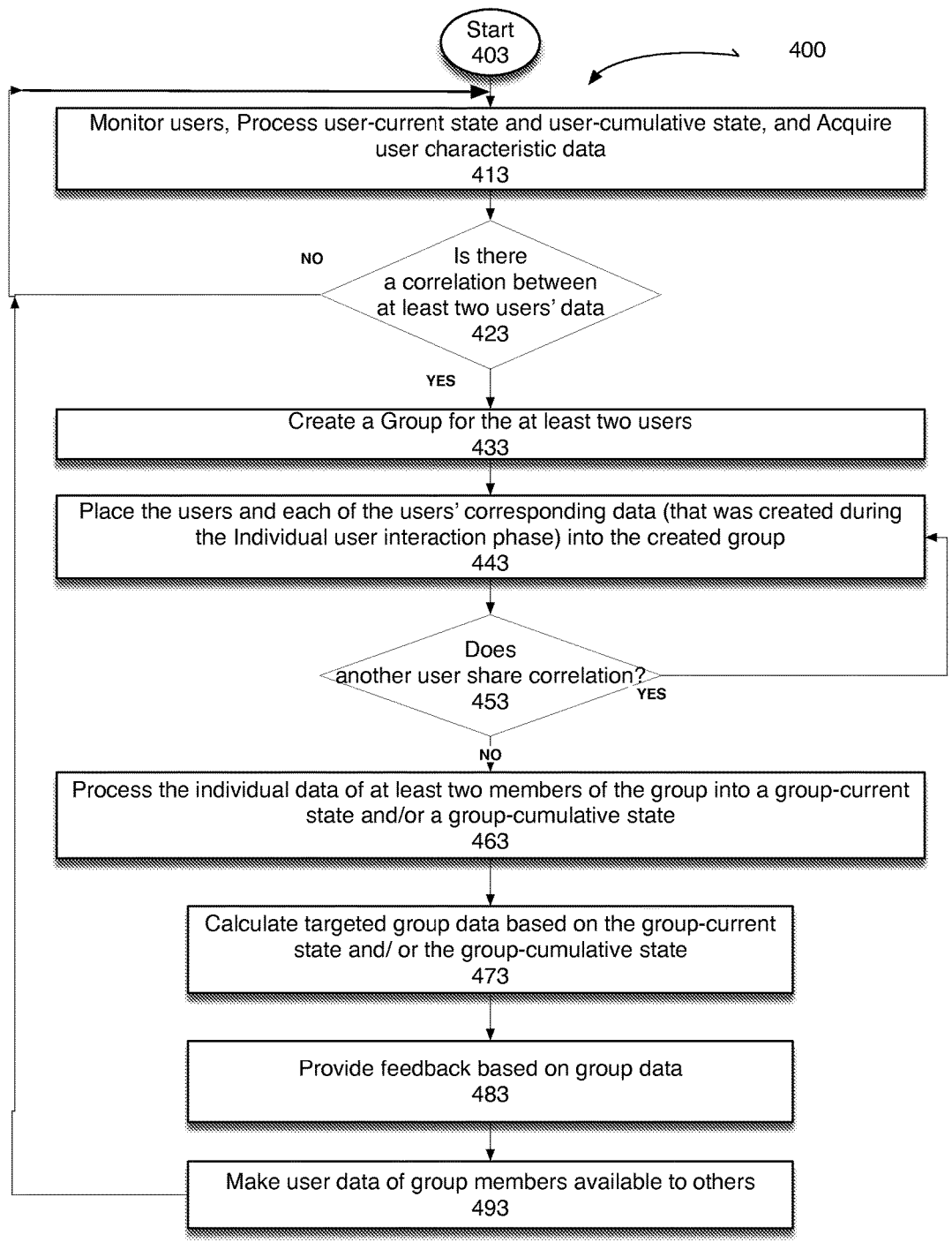
FIG. 4 is overview flowchart illustrating one embodiment of a process of using measurement to facilitate audience interactions based on group affiliation.

FIG. 4 is one embodiment of an overview flowchart illustrating a process 400 of using measurement to facilitate audience interactions based on group affiliation.

Process 400 begins at block 403. At block 413, process 400 monitors two or more users wearing bands having audience interaction applications, processes the monitored data into user-current states and/or user-cumulative states, including user viewer status. In one embodiment, the system also acquires user characteristic data, e.g. age, gender, location, etc.

At block 423, process 400 determines if there is a correlation between at least two users' data. The data in block 423 refers to the reaction data, the choice data, the user-current states, the user-cumulative states, and or the user characteristics.

If a correlation does not exist, process 400 returns to block 413 to continue the process of monitoring, processing, and acquiring.

On the other hand, if a correlation does exist, process 400 proceeds to block 433. At block 433, a group is created for the at least two users based on the correlation between the users' data.

At block 443, the users and their corresponding data, including their reaction data, their choice data, their user-current states, their user-cumulative states, and their targeted user data, are placed into the newly created group.

At block 453, process 400 determines if there is at least one other user that shares the same correlation as the members of the newly created group. If there is at least one such member, then the process 400 returns to block 443 to include the newly discovered user and his/her corresponding data into the group. If, however, no such member exists, then process 400 proceeds to block 463.

At block 463, process 400 processes the user data of the members of the group into a group-current state and/or a group-cumulative state.

At block 473, process 400 calculates the targeted user data of the group based on the group-current state and/or the group cumulative state.

At block 483, feedback is provided based on the group members. In one embodiment, the feedback is at least one of the group-current state, the group cumulative state, and/or the targeted user data of the group. The feedback may be provided to all group members, a subset of the group members, or non-members of the group. In one embodiment, at least one of the group-current state, the group cumulative state, and/or the targeted user data of the group is provided to at least one band that is worn by a user that is not a member of the group. In one embodiment, at least one of the group-current state, the group cumulative state, and/or the targeted user data of the group is provided to a display device of at least one person that does not have a band.

After the data has been provided, process 400 can optionally proceed to block 493. At block 493, the data about individual group members is made available to the group members, and optionally others. In one embodiment, this data may be provided as push data or pull data. In one embodiment, this data is only provided upon request by a user. In one embodiment, the requesting and provision of data about other users is limited to only those users that are in the same group.

The process then returns to block 403 to continue monitoring for groups and correlations.

Figure 5A:
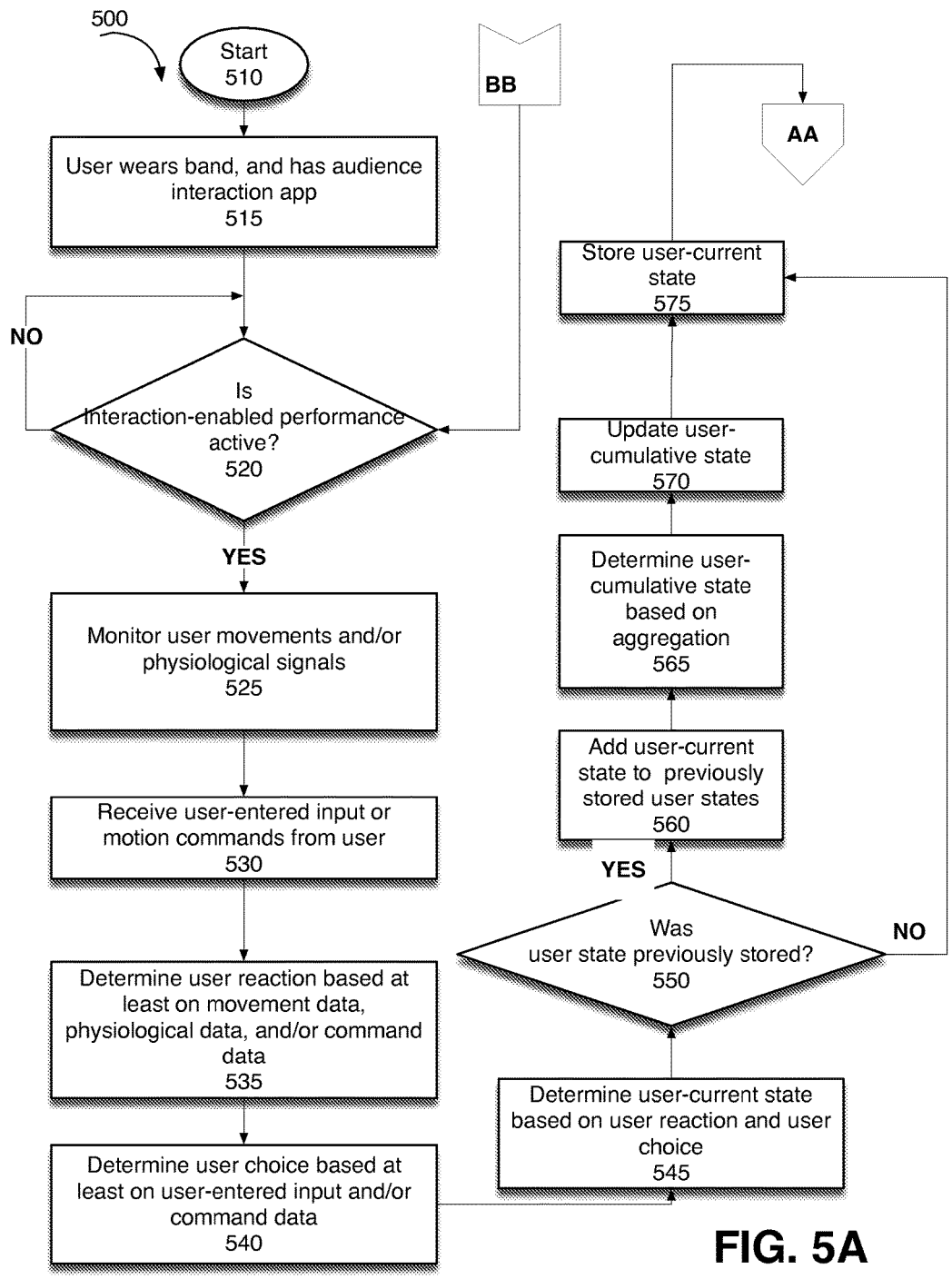
FIGS. 5A-5B are a flowchart of one embodiment of a process for measuring a user's reactions and choices, and providing information to the user based on the user's reactions and choices.
Figure 5B:
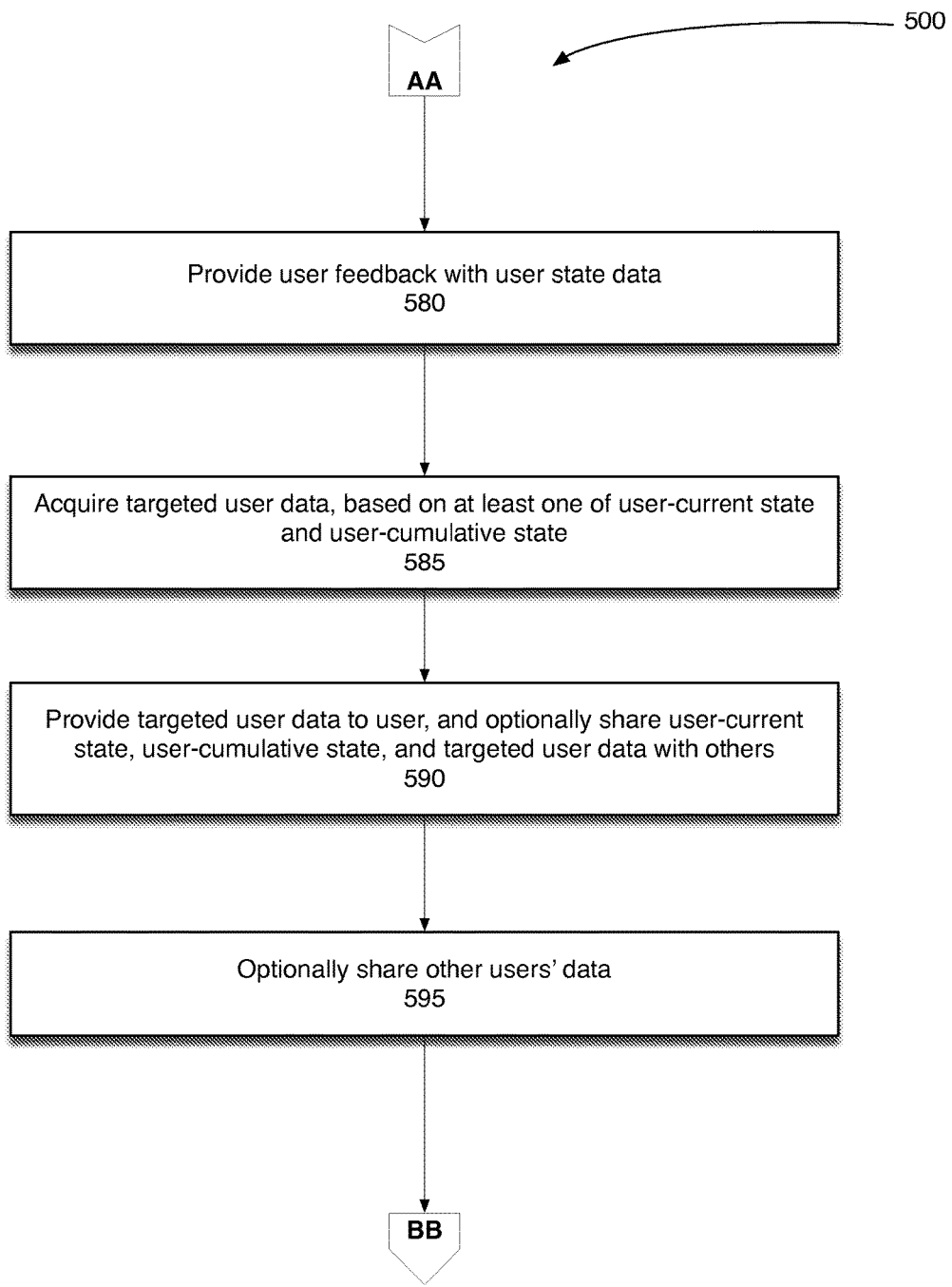

FIGS. 5A and 5B are a flowchart of one embodiment of a process 500 for measuring a user's reactions and choices, and providing information to the user based on the user's reactions and choices.

Process 500 begins at block 510. At block 515, process 500 identifies a user wearing a band with the audience interaction application. At block 520, process 500 determines whether the user is interacting with an interaction-enabled performance.

If an interaction enabled performance is not active, process 500 waits until the user is interacting with an interaction-enabled performance. In one embodiment, this is not a continuous checking, but rather awaiting an enabling signal, whether from the user or remotely based on time—e.g. when the associated performance is regularly scheduled—or a sent activation signal.

At block 525 the process monitors the user's movements and physiological signals. At block 530, user-entered input or motion commands are obtained, if appropriate.

At block 535, the user's reactions are determined based on the movements and physiological signals. In one embodiment, the reaction evaluation is also dependent on the user's viewer status. A user at a live performance is expected to have higher energy and more interactivity than a non-viewing user who is monitoring the performance while at work. Thus, for example, an energetic thumbs up from a non-viewing user is considered as strong as a jumping up and cheering from an in-person viewer. In one embodiment, the reactions may also be customized based on the user's general responsiveness and emotionality. The system would not expect a middle aged man to have the same emotional reaction levels as a young child.

At block 540, user's choices are determined based on the user entered input or motion commands.

At block 545, process determines the user's user-current state.

Process 500 determines, at block 550, if the user has any previously stored states. If the user does not have any previously stored states, process 500 continues to block 575, as described below. If the user has previously stored states, at block 560, process 500 adds the user-current state from block 545 to the previously stored states.

At block 565, a new user-cumulative state is determined, based on the stored user-current states. At block 570, the user-cumulative state previously stored is updated with the new data.

At block 575, the user-current state is stored.

At block 580, the user's state data is provided as feedback to the user.

At block 590, process determines what type of targeted user data is appropriate to this user, and provides it to the user. The targeted user data is selected based on the user's current state, including viewing state, and cumulative state. The targeted data may be facts about the performance, performers, subject of the performance, etc. The targeted data may also be upcoming voting options, or data about the user's prior votes, etc.

At block 595, other user's data is shared with the user, and vice versa. In one embodiment, such sharing of user data is opt-in. The user may choose to share his or her data, individually, as a group member, or cumulatively with other users, groups, or the audience at large. Similarly, other users may choose to share their data, and this user may optionally access the data of those who have opted in. In one embodiment, the cumulative data is shared by default. Cumulative data, in one embodiment, is the audience-wide data. So, for example, the user may be informed that the performer he or she cheered for was liked by 52% of the audience, but not as much as another performer, who was liked by 65% of the audience.

The process then returns to block 520 to continue monitoring the user's experience, and provide the user interaction and engagement.

Figure 6:
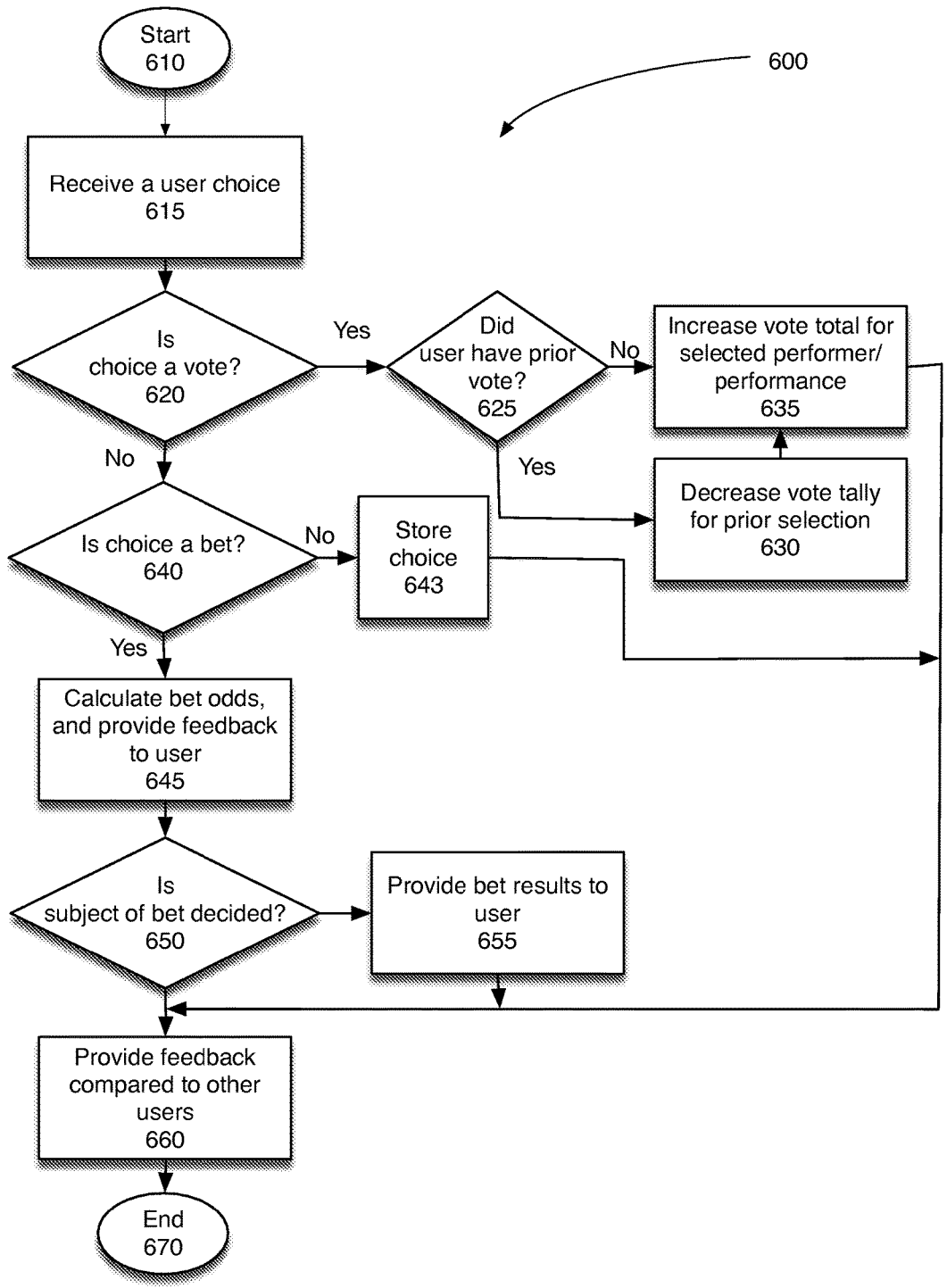
FIG. 6 a flowchart of one embodiment of user choices, and responses to the choices.

FIG. 6 is a flowchart illustrating one embodiment of user choices and interactions. The process starts at block 610.

At block 615, the system receives the user's choice. In on embodiment, the choice may be made using a user interface on the band or associated mobile device. In one embodiment, the choice may be made via gesture command. In one embodiment, the choice may be made in response to a prompting to make a choice during the performance.

At block 620, the process determines whether the choice was a vote. Certain performances, such as competitions, permit voting for performers. Similarly, for political debates or similar performances, a vote indicating who "won" a particular point would be considered a vote. If the choice was a vote, the process continues to block 625.

At block 625, the process determines whether the user had previously voted in this contest. If so, the vote tally for the prior vote, now taken away, is decreased at block 630. The vote tally for the performer, selection, idea, performance that the user voted for is increased at block 635. In one embodiment, the user's band may be altered to represent his or her choice. For example, the user's band may light up a certain color, representing the vote cast. This would provide a visual feedback in the audience, showing the voting patterns of the audience. Other ways of providing feedback, including audio or display-based, may also be used.

The process then continues to block 660. At block 660, the system optionally provides feedback to the user, regarding the choices of other users. The comparison may be to all other users, a subset of users such as those who are in a common group with the user, friends of the user, or other groupings. The process then ends at block 670.

If the choice was not a vote, the process at block 640 determines whether the choice was a bet. If so, at block 645, the system calculates the odds of the bet. In one embodiment, the user is provide feedback on their bet selection. In one embodiment, this may be done before the bet is committed. For example, the user may say "Performer A wins by 2 points." The system would then calculate the odds of that occurring, and inform the user that there is a 1-in-20 chance of this bet being accurate. In one embodiment, in some circumstances, there may be a payout associated with such a bet. In that case, in addition to providing odds information, the system would also provide payout information. The payout may be monetary (e.g. a bet on the outcome of a horse race), "points" in a contest, position in a comparative contest, etc.

In one embodiment, bets may be made on the final outcomes of performances (such as the final winner of a sports contest or other contest), the sequence of winners or losers (such as the order in which performers are eliminated), the point spread between the winner and the loser, etc. Bets may be triggered by the system, e.g. the user may be informed that they have a short period in which to place bets prior to the initiation of the contest. Alternatively, the user may initiate the placement of a bet at any time during the window when betting on this matter is available.

At block 650, the process determines whether the subject of the bet is decided. When subject of the bet is decided, at block 655 the bet result is provided to user. In one embodiment, the bet result may include the payout.

At block 660, feedback is provided to the user, comparing his or her outcomes to the outcomes of other users. The process then ends.

FIGS. 7A-7D illustrate some exemplary interaction meters. Interaction meters are used to present a user's user-current state, user-cumulative state, group-current state, group-cumulative state, and/or targeted user data to the user of an audience interaction system. In one embodiment, interaction meters are presented to users on their bands. In one embodiment, interaction meters may be presented to a person that is not wearing a band or using an audience interaction system. In one embodiment, the interaction meter is presented to the person that is not using the audience interaction system on the person's smartphone, computer, or other display device.

Figure 7A:
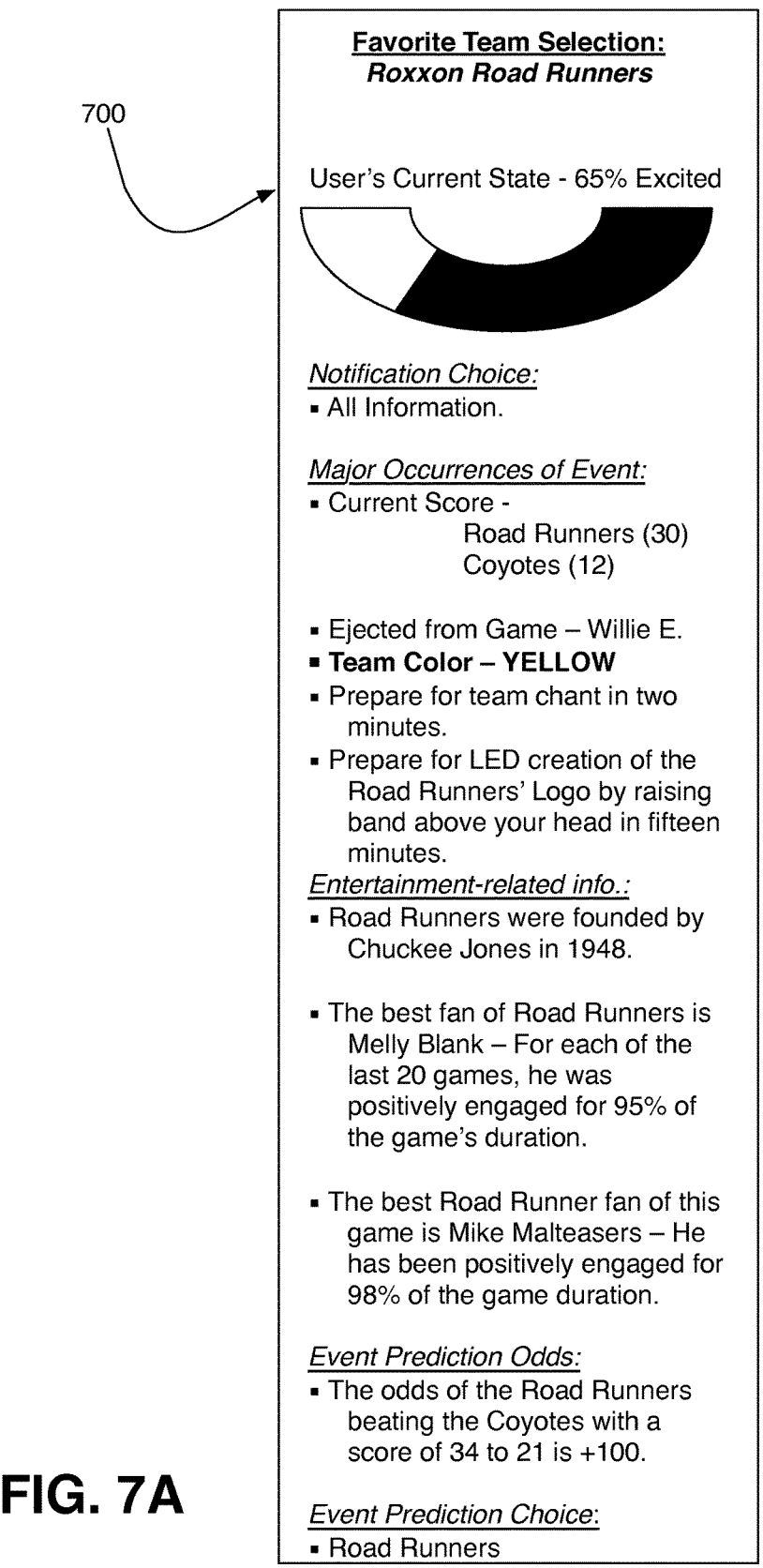
FIG. 7A is an exemplary interaction meter that includes a user's user-current state and targeted user data.
Figure 7B:
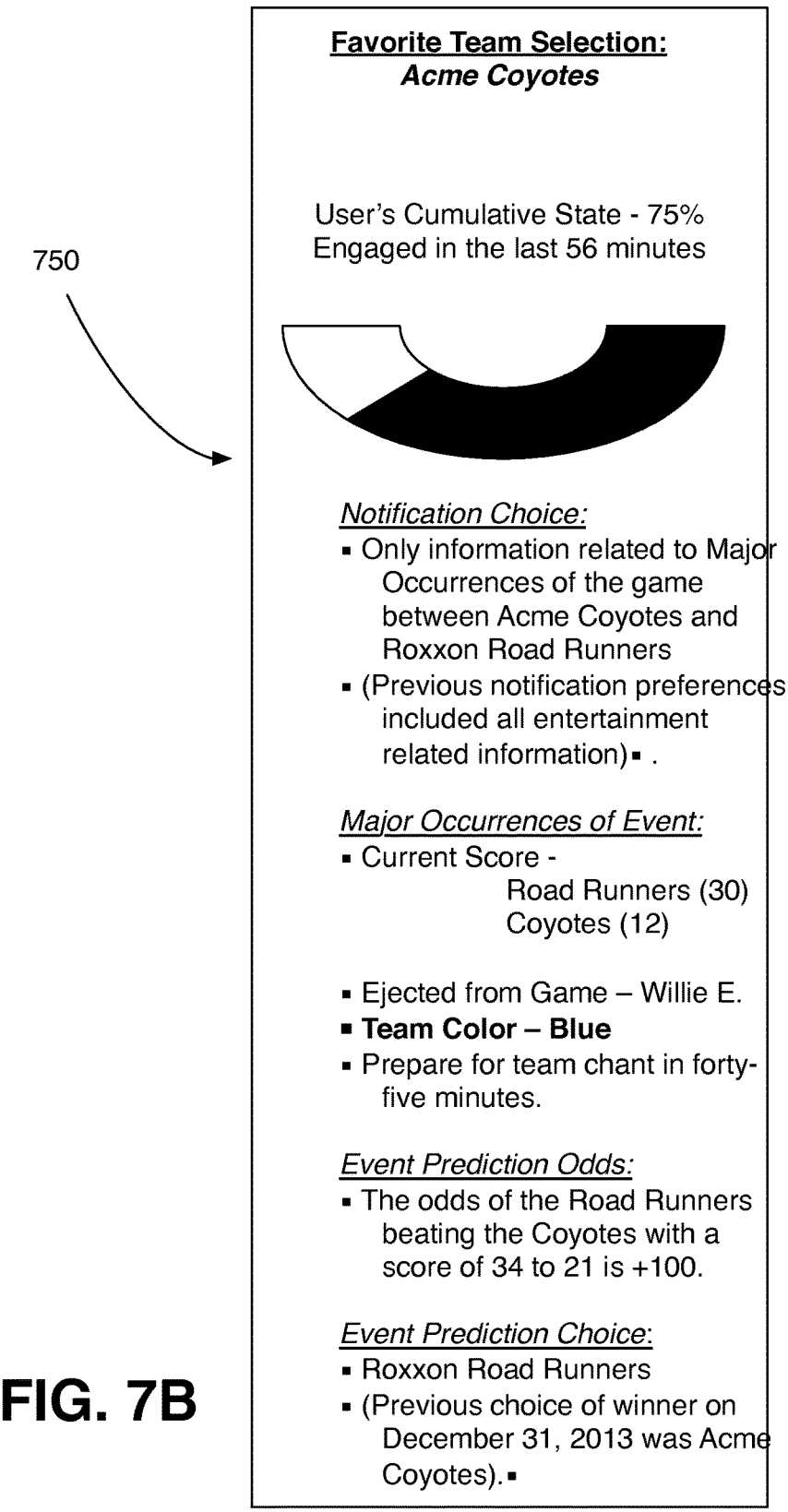
FIG. 7B is an exemplary interaction meter that includes a user's user-cumulative state and targeted user data.
Figure 7C:
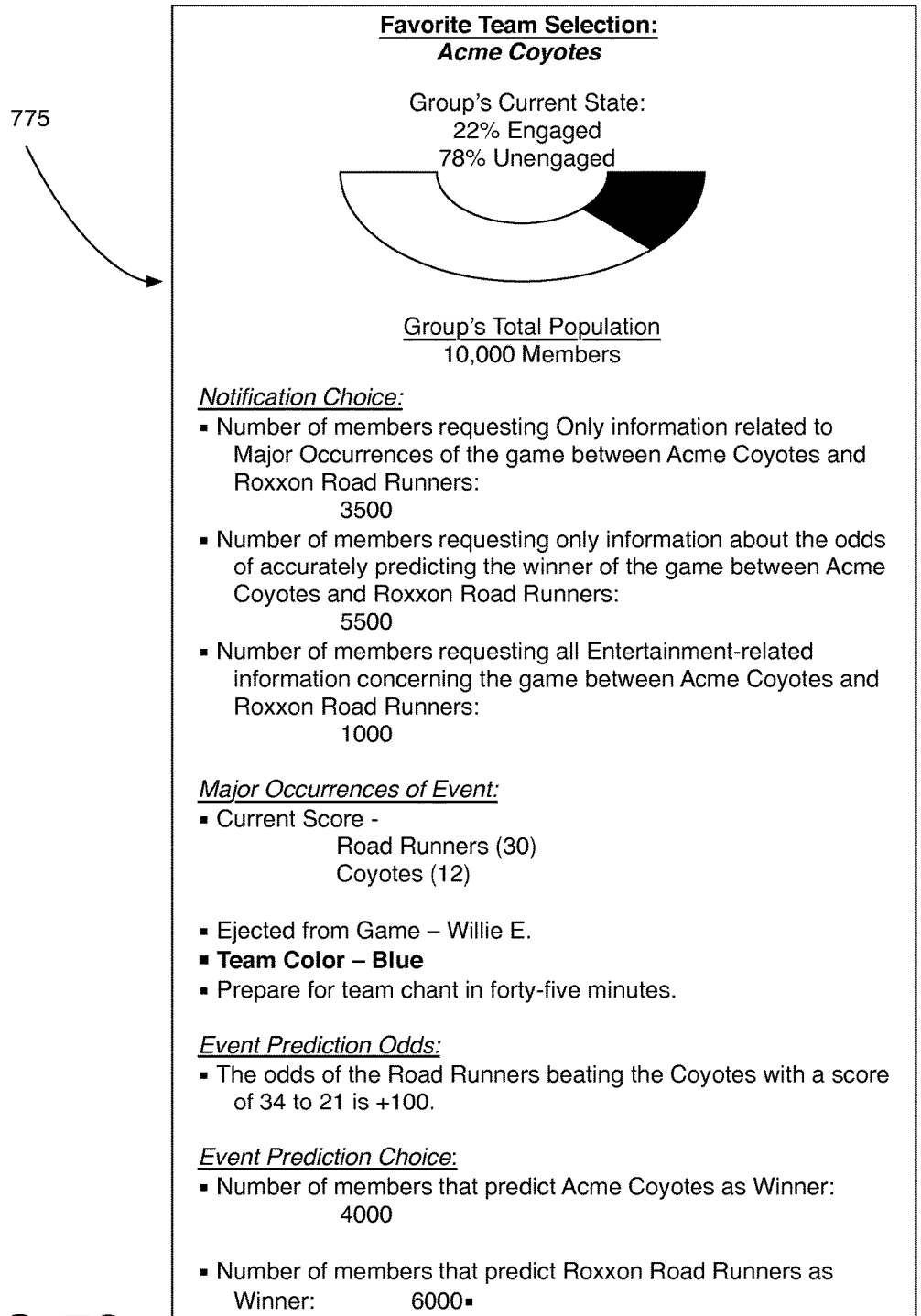
FIG. 7C is an exemplary interaction meter that includes a group of users' group-current state and targeted user data.
Figure 7D:
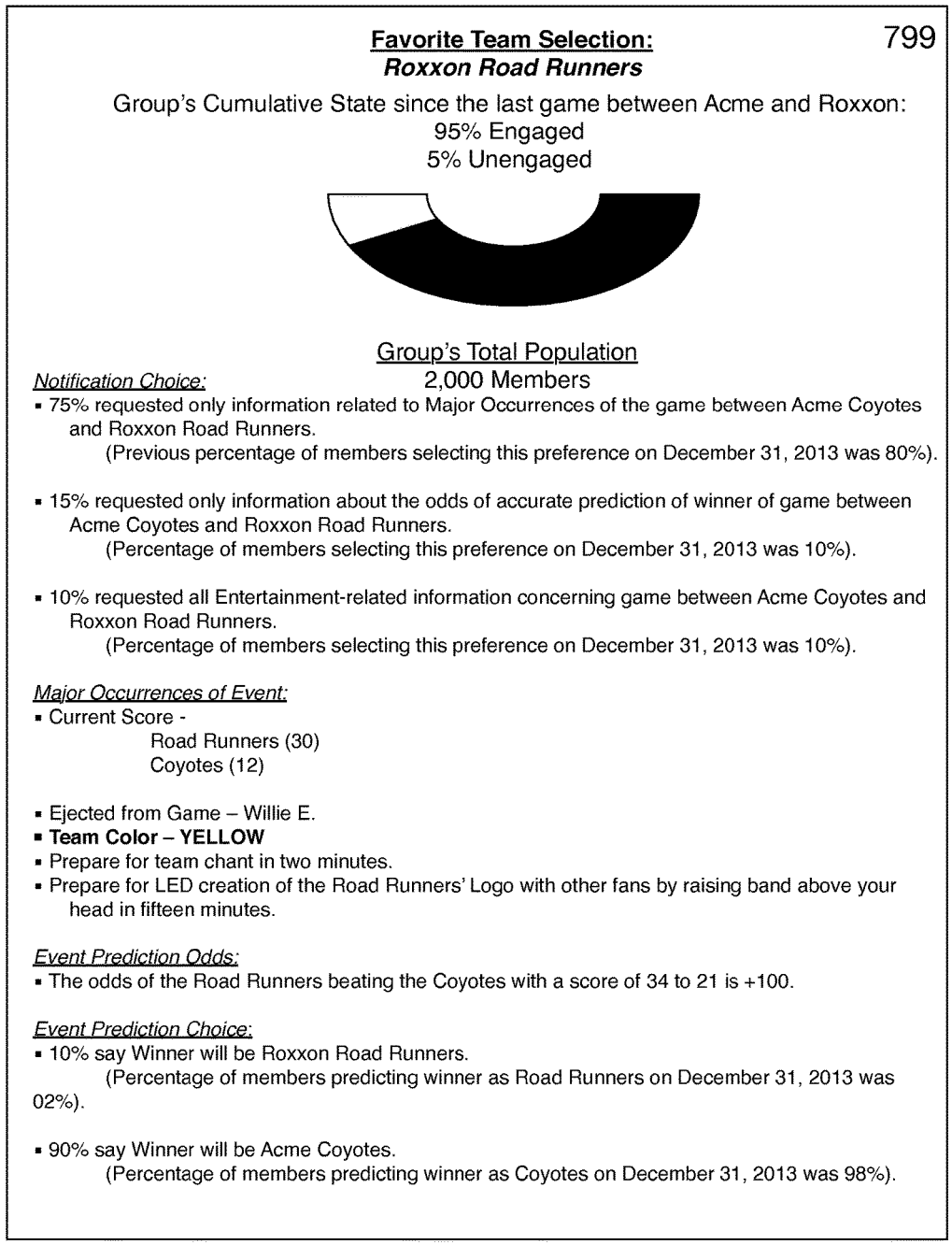
FIG. 7D is an exemplary interaction meter that includes a group of users' group-cumulative state and targeted user data.

Interaction meters vary significantly. FIG. 7A provides an interaction meter in the form of a visual display of a user's user-current state, which includes the user's current reaction, current choices, and targeted user data. FIG. 7B provides an interaction meter in the form of a visual display of a user's user-cumulative state, which includes the user's reactions, choices, and targeted user data over a period of fifty-six (56) minutes. FIG. 7C provides an interaction meter in the form of a visual display of a group's group-current state, which includes the group's current reactions, current choices, and targeted user data. FIG. 7D provides an interaction meter in the form of a visual display of a group's group-cumulative state, which includes the group's reactions, choices, and targeted user data over two different presentations.

Figure 8:
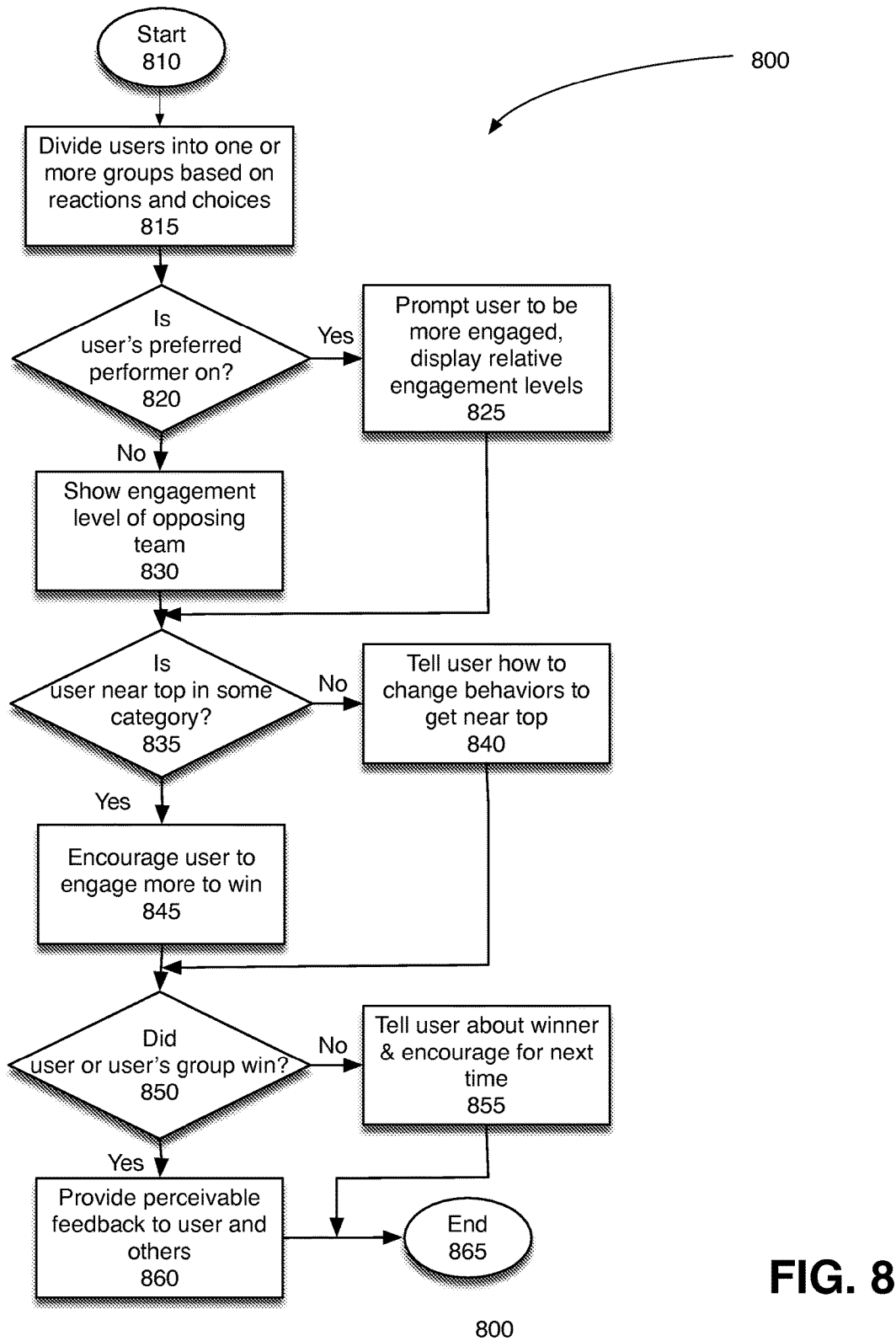
FIG. 8 is a flowchart of one embodiment of enhancing user engagement using competition.

FIG. 8 is one embodiment of a flowchart to provide data to a user based on a correlation between an actual occurrence at a performance and a prediction of that occurrence that was made by the user or by a third party.

In one embodiment, information may be provided to a user based on a correlation between an actual occurrence at a performance and a prediction made by the user or by a third party. In one embodiment, information may be provided to a user based on his notification preferences.

In one embodiment, feedback can be provided to a user based on third parties' selections that designate that certain information should be provided to users based on correlations between actual outcomes and predictions that were made by the third parties.

FIG. 8 is a flowchart of one embodiment of encouraging engagement by providing feedback and engagement data from other audience members. The process starts at block 810. In one embodiment, this process starts when a user with the band starts interacting with a performance.

At block 815, the users are divided into a plurality of groups. In one embodiment, the grouping may be based on preferences for a particular performer, team, performance, style, etc. In one embodiment, the grouping may be based on user characteristics, such as gender, age range, alma matter, etc. In one embodiment, grouping may additionally be based on viewer status.

At block 820, the process determines whether the user's preferred performer/team/style is being currently presented. If so, the user is prompted to be more engaged, to cheer or otherwise interact with the performance, at block 825. In one embodiment, the relative engagement levels of the user, user's group, and the competing group(s) are displayed. For example, the system may say "you cheered at 70% enthusiasm. Great job! But the team supporting Performer B was at 75%." This may be provided visually, via text or other feedback. Or more simply, in one embodiment, the feedback may be provided visually, or based on a percentage display.

In one embodiment, if the user's preferred performer is not on, at block 830 the engagement level of the opposing "team(s)" are shown. In one embodiment, this is shown in comparison to the user's own engagement, or the user's group engagement.

At block 835, the process determines whether the user is near the top engagers, individual, in a group, as supporters of a particular person, or in some other categorization that is tracked by the system. If not, at block 840, the system provides suggestions to the user how to improve.

If the user is near the top, the user is encouraged to engage a little more, to win/be the most engaged.

At block 850, the process determines whether the user, or user's group won in the contest. In one embodiment, the contest may be split into a large number of "groups" so that a significant percentage of the users can win. If the user did not win, at block the user is told about the winner, and encouraged to do better next time. If the user did win, in one embodiment, perceivable feedback is provided to the user and others. In one embodiment, there may be multiple group winners, and multiple individual winners, and one overall top winner.

In one embodiment, the perceivable feedback may include audio feedback, on the winning user's band or smartphone in one embodiment. The perceivable feedback may be visual, such as a bright lights on the band or smart phone. In one embodiment, one or more winners may be given a special prize. For example, the overall most engaged winner watching a presentation remotely may be given a ticket to a subsequent performance. A most engaged winner in the audience in person may be given a backstage pass or the like. In this way, the user's engagement level is ratcheted up significantly. It makes the user less likely to get disengaged, and keeps the attention on the performance. The process then ends, at block 865.

Figure 9:
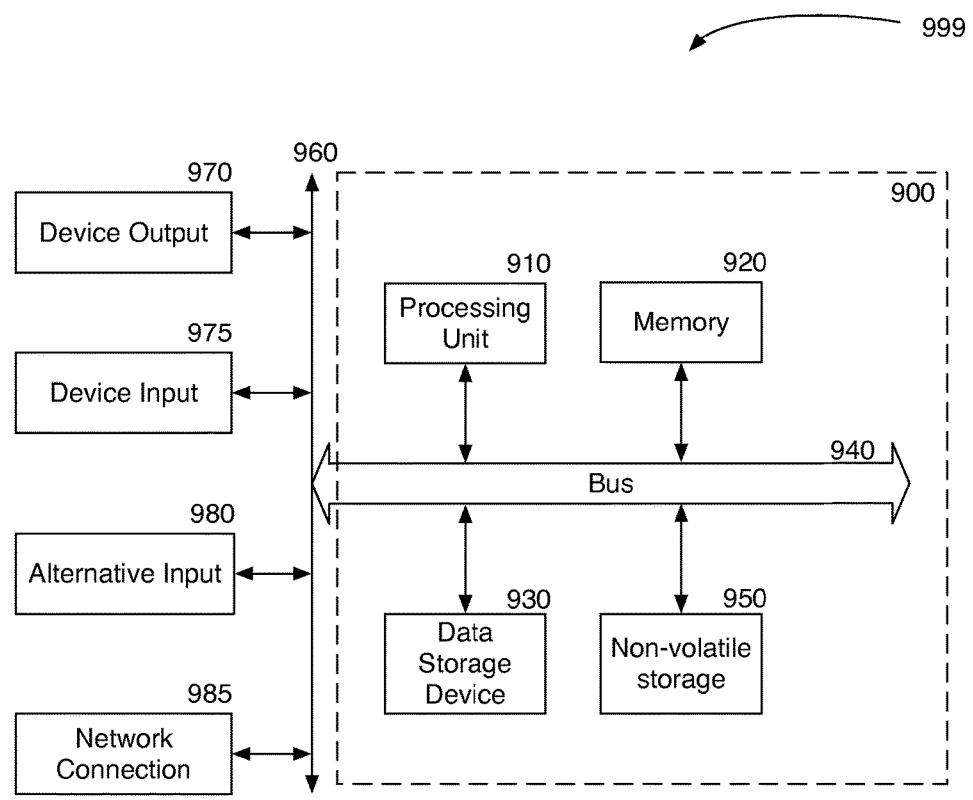
FIG. 9 is one embodiment of the computer system that may be used with the present invention.

FIG. 9 is a block diagram of a particular machine that may be used with the present invention. It will be apparent to those of ordinary skill in the art, however that other alternative systems of various system architectures may also be used.

Data processing system 999 illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device.

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, cellular network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine, which embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 920 and/or 950.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network connection 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method for increasing audience engagement with a performance, comprising:
   utilizing a band worn by a user to collect sensor data to monitor the user's natural reactions to the performance without a need for other data collection apparatus, the natural reactions determined based on motion data;
   receiving user choice data from the user, the user choice data comprising deliberate input by the user, the user choice data made in connection with the performance;

receiving the sensor data at a user mobile device, and transmitting the sensor data, including the user motion data and the user choice data from the user mobile device to a server utilizing a transceiver system;
generating a user's current state, based on the sensor data and the user choice data; and
providing at least one of a current reaction and a current choice of another user to the user through the band worn by the user; and
providing feedback based on the user's reactions and choices through the transceiver system, the feedback designed to increase engagement of the user with the performance.

2. The method of claim 1, wherein the reactions comprise physiological data from the user, determined based on the sensor data from one or more sensors, wherein the sensors comprise at least a motion sensor.

3. The method of claim 2, wherein the physiological data includes at least one of skin temperature, heart rate, and respiration rate.

4. The method of claim 1, wherein the choices are input by one of: using a user interface, a gesture command, and a reaction in response to a query, and wherein the choice includes at least one of a selection, a preference, a vote, a prediction, and a bet.

5. The method of claim 1, further comprising:
determining a user experience selected from among: the user is present in a live audience watching a live performance, watching the live performance remotely, watching a recorded performance, or a fan of the performance who cannot watch; and
the feedback customized based on the user experience.

6. The method of claim 1, further comprising:
when prior user state data is available, generating a user cumulative state, the user cumulative state reflecting the user's attitude toward the performances over time.

7. The method of claim 6, further comprising:
defining one or more groups of users, each group of users having at least some features in common, the features selected from among: user reactions, user choices, and user characteristics; and
calculating group reactions and group choices.

8. The method of claim 1, further comprising:
identifying targeted user data for the user, based on at least one of the user-current state of the user and the user-cumulative state, the targeted user data communicating with the user, regarding the performance.

9. The method of claim 1, wherein the band is associated with a mobile computer system, the mobile computing system providing a richer interface for user input and feedback.

10. The method of claim 7, further comprising:
engaging the user in a competition with a plurality of other users or groups, the competition based on the user's reactions and choices.

11. The method of claim 10, further comprising:
providing feedback to the user, when the user has a correct selection in the competition, is more engaged than other competitors in the competition, the feedback perceivable by third parties.

12. The method of claim 1, further comprising:
providing visible feedback to a plurality of users wearing the bands, the visible feedback designed to engage the plurality of users by working together to create an audience-wide display.

13. The method of claim 1, further comprising:
providing pseudo-real-time feedback to performers in the performance, the feedback enabling the performers to adapt the performance in real-time based on the user choices and the user reactions.

14. A system for increasing audience engagement with a performance, comprising:
a transceiver system to receive user motion data from a user mobile device which receives sensor data from a body-worn device worn by the user to monitor the user's reactions;
the transceiver system to receive user choice data from the user mobile device;
the body-worn device to determine the user's current reaction to the performance, the current reaction determined based on the motion data; and
the body-worn device to determine the user's current choice made in connection with the performance based on the user choice data;
the body-worn device to provide at least one of a current reaction and a current choice of another user to the user; and
the transceiver system to provide feedback based on the user-current choice and user-current reaction, the feedback designed to increase engagement of the user with the performance.

15. The system of claim 14, further comprising:
the body-worn device to determine a cumulative set of reactions of a plurality of users in a group, the group based on one or more unifying characteristics of the plurality of user wherein the unifying characteristics of a group are selected from among: user reactions, user choices, and user characteristics.

16. The system of claim 14, further comprising:
the body-worn device to determine a user experience selected from among: the user is present in a live audience watching a live performance, watching the live performance remotely, watching a recorded performance, or a fan of the performance who cannot watch; and
the output/feedback logic to adjust the feedback based on the user experience.

17. The system of claim 14, wherein the user-current reaction data is based on physiological data including at least one of skin temperature, heart rate, and respiration rate.

18. The system of claim 14, wherein the choice includes at least one of a selection, a preference, a vote, a prediction, and a bet.

19. The system of claim 14, further comprising:
the body-worn device generating a user cumulative state based on the user current state and prior recorded user state data, the user cumulative state reflecting the user's attitude toward the performances over time.

20. The system of claim 14, further comprising:
the transceiver system to identify targeted user data for the user, based on at least one of the user-current state of the user and the user-cumulative state, the targeted user data for communication with the user, regarding the performance.

21. The method of claim 1, wherein the another user comprises at least one of a single user and a group of users.

22. A method for increasing audience engagement with a performance, comprising:
utilizing a band worn by a user to collect sensor data to monitor the user's natural reactions during the performance without a need for other data collection apparatus, the sensor data comprising motion data;

receiving choice data from the user, the choice data comprising deliberate input by the user made in connection with the performance;
receiving the sensor data at a user mobile device, and transmitting the sensor data including the national reactions and the choice data from the user mobile device to a server utilizing a transceiver system;
generating a user's current state, based on a combination of the natural reactions and the user choice data;
providing at least one of a current reaction and a current choice of another user to the user through the band worn by the user; and
providing feedback to the user based on the user's reactions and choices through the transceiver system, the feedback designed to increase engagement of the user with the performance.

* * * * *